US 008745048B2

(12) United States Patent
Hangartner

(10) Patent No.: US 8,745,048 B2
(45) Date of Patent: *Jun. 3, 2014

(54) SYSTEMS AND METHODS FOR PROMOTIONAL MEDIA ITEM SELECTION AND PROMOTIONAL PROGRAM UNIT GENERATION

(75) Inventor: Rick Hangartner, Corvallis, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/963,043

(22) Filed: Dec. 8, 2010

(65) Prior Publication Data

US 2011/0119127 A1 May 19, 2011

Related U.S. Application Data

(62) Division of application No. 11/541,915, filed on Oct. 2, 2006, now Pat. No. 7,877,387.

(60) Provisional application No. 60/722,750, filed on Sep. 30, 2005, provisional application No. 60/730,599, filed on Oct. 26, 2005.

(51) Int. Cl.
G06F 7/00 (2006.01)
G06F 17/30 (2006.01)
G06Q 30/00 (2012.01)

(52) U.S. Cl.
USPC ........................................ 707/732; 705/14.46

(58) Field of Classification Search
None
See application file for complete search history.

(56) References Cited

U.S. PATENT DOCUMENTS 5,355,302 A 10/1994 Martin
5,375,235 A 12/1994 Berry
5,408,519 A 4/1995 Pierce et al.
(Continued)

FOREIGN PATENT DOCUMENTS

BE 1015704 7/2005
DE 19941461 3/2001
(Continued)

OTHER PUBLICATIONS

Dempster, Y., Laird, N., and Rubin, D. "Maximum Likelihood from Incomplete Data via the EM Algorithm". Jour. of the Royal Stat. Soc., Ser. B., 39:1047-1053, 1977.

(Continued)

Primary Examiner — Rehana Perveen
Assistant Examiner — Raheem Hoffler
(74) Attorney, Agent, or Firm — Novak Druce Connolly Bove + Quigg LLP

(57) ABSTRACT

A computer implemented process for generating customized, user-specific programming for delivery over a network, each programming unit comprising one or more media items, such as song tracks, and at least one promotional media item, such as a commercial advertisement. The media items are selected in response to implicit user taste data, and promotional media items or ads are selected where a media item associated with the promotional media item matches at least one media data item identified as responsive to the user taste data. The media items and the promotional media items are selected so as to constrain the promotional program unit to incur a net cost of no more that a selected maximum cost, wherein the net cost is determined as a sum of the licensing costs of the selected media items, reduced by a sum of the expected revenues generated by the selected promotional media items.

21 Claims, 5 Drawing Sheets

(56) References Cited

U.S. PATENT DOCUMENTS

| | | |
|---|---|---|
| 5,464,946 A | 11/1995 | Lewis |
| 5,483,278 A | 1/1996 | Strubbe |
| 5,583,763 A | 12/1996 | Atcheson |
| 5,613,213 A | 3/1997 | Naddell et al. |
| 5,640,590 A | 6/1997 | Luther |
| 5,697,844 A | 12/1997 | Von Kohorn |
| 5,724,521 A | 3/1998 | Dedrick |
| 5,754,939 A | 5/1998 | Herz |
| 5,758,257 A | 5/1998 | Herz |
| 5,890,152 A | 3/1999 | Rapaport |
| 5,892,451 A | 4/1999 | May |
| 5,918,014 A | 6/1999 | Robinson |
| 5,950,176 A | 9/1999 | Keiser |
| 5,978,775 A | 11/1999 | Chen |
| 5,978,833 A | 11/1999 | Pashley et al. |
| 6,000,044 A | 12/1999 | Chrysos |
| 6,009,458 A | 12/1999 | Hawkins |
| 6,023,700 A | 2/2000 | Owens et al. |
| 6,038,591 A | 3/2000 | Wolfe |
| 6,043,818 A | 3/2000 | Nakano |
| 6,047,311 A | 4/2000 | Ueno |
| 6,097,942 A | 8/2000 | Laiho |
| 6,112,186 A | 8/2000 | Bergh |
| 6,134,532 A | 10/2000 | Lazarus |
| 6,205,432 B1 | 3/2001 | Gabbard |
| 6,222,925 B1 | 4/2001 | Shiels |
| 6,269,361 B1 | 7/2001 | Davis et al. |
| 6,334,145 B1 | 12/2001 | Adams et al. |
| 6,338,044 B1 | 1/2002 | Cook et al. |
| 6,345,279 B1 | 2/2002 | Li et al. |
| 6,345,288 B1 | 2/2002 | Reed |
| 6,346,951 B1 | 2/2002 | Mastronardi |
| 6,347,313 B1 | 2/2002 | Ma |
| 6,349,339 B1 | 2/2002 | Williams |
| 6,381,465 B1 | 4/2002 | Chern et al. |
| 6,381,575 B1 | 4/2002 | Martin |
| 6,389,278 B1 | 5/2002 | Singh |
| 6,405,243 B1 | 6/2002 | Nielsen |
| 6,408,309 B1 | 6/2002 | Agarwal |
| 6,430,539 B1 | 8/2002 | Lazarus |
| 6,434,621 B1 | 8/2002 | Pezzillo |
| 6,438,557 B1 | 8/2002 | Dent |
| 6,438,579 B1 | 8/2002 | Hosken |
| 6,487,539 B1 | 11/2002 | Aggarwal |
| 6,516,416 B2 | 2/2003 | Gregg |
| 6,526,411 B1 | 2/2003 | Ward |
| 6,532,469 B1 | 3/2003 | Feldman |
| 6,577,716 B1 | 6/2003 | Minter |
| 6,587,127 B1 | 7/2003 | Leeke |
| 6,596,405 B2 | 7/2003 | Dunning |
| 6,615,208 B1 | 9/2003 | Behrens |
| 6,628,247 B2 | 9/2003 | Toffolo |
| 6,633,318 B1 | 10/2003 | Kim |
| 6,646,657 B1 | 11/2003 | Rouser |
| 6,647,371 B2 | 11/2003 | Shinohara |
| 6,684,249 B1 | 1/2004 | Frerichs et al. |
| 6,687,696 B2 | 2/2004 | Hofmann |
| 6,690,918 B2 | 2/2004 | Evans |
| 6,704,576 B1 | 3/2004 | Brachman |
| 6,718,551 B1 | 4/2004 | Swix et al. |
| 6,748,395 B1 | 6/2004 | Picker et al. |
| 6,751,574 B2 | 6/2004 | Shinohara |
| 6,785,688 B2 | 8/2004 | Abajian |
| 6,816,724 B1 | 11/2004 | Asikainen |
| 6,826,572 B2 | 11/2004 | Colace et al. |
| 6,842,761 B2 | 1/2005 | Diamond |
| 6,850,252 B1 | 2/2005 | Hoffberg |
| 6,914,891 B2 | 7/2005 | Ha |
| 6,920,326 B2 | 7/2005 | Agarwal et al. |
| 6,931,454 B2 | 8/2005 | Deshpande |
| 6,941,324 B2 | 9/2005 | Plastina |
| 6,947,922 B1 | 9/2005 | Glance |
| 6,950,804 B2 | 9/2005 | Strietzel |
| 6,987,221 B2 | 1/2006 | Platt |
| 6,990,497 B2 | 1/2006 | O'Rourke |
| 6,993,532 B1 | 1/2006 | Platt |
| 7,020,637 B2 | 3/2006 | Bratton |
| 7,021,836 B2 | 4/2006 | Anderson |
| 7,035,812 B2 | 4/2006 | Meisel et al. |
| 7,051,352 B1 | 5/2006 | Schaffer |
| 7,058,696 B1 | 6/2006 | Phillips et al. |
| 7,072,846 B2 | 7/2006 | Robinson |
| 7,072,947 B1 | 7/2006 | Knox et al. |
| 7,082,407 B1 | 7/2006 | Bezos |
| 7,096,234 B2 | 8/2006 | Plastina |
| 7,111,240 B2 | 9/2006 | Crow |
| 7,113,917 B2 | 9/2006 | Jacobi |
| 7,113,999 B2 | 9/2006 | Pestoni |
| 7,120,619 B2 | 10/2006 | Drucker |
| 7,127,143 B2 | 10/2006 | Elkins, II |
| 7,136,866 B2 | 11/2006 | Springer, Jr. |
| 7,136,903 B1 | 11/2006 | Phillips et al. |
| 7,139,723 B2 | 11/2006 | Conkwright |
| 7,149,537 B1 | 12/2006 | Kupsh et al. |
| 7,174,126 B2 | 2/2007 | McElhatten |
| 7,174,309 B2 | 2/2007 | Niwa |
| 7,180,473 B2 | 2/2007 | Horie |
| 7,181,415 B2 | 2/2007 | Blaser et al. |
| 7,188,085 B2 | 3/2007 | Pelletier |
| 7,194,421 B2 | 3/2007 | Conkwright |
| 7,197,472 B2 | 3/2007 | Conkwright |
| 7,222,105 B1 | 5/2007 | Romansky |
| 7,224,282 B2 | 5/2007 | Terauchi |
| 7,225,342 B2 | 5/2007 | Takao |
| 7,236,941 B2 | 6/2007 | Conkwright |
| 7,246,041 B2 | 7/2007 | Fukuda |
| 7,256,341 B2 | 8/2007 | Plastina |
| 7,277,870 B2 | 10/2007 | Mourad |
| 7,296,158 B2 | 11/2007 | Staddon |
| 7,302,419 B2 | 11/2007 | Conkwright |
| 7,302,468 B2 | 11/2007 | Wijeratne |
| 7,328,343 B2 | 2/2008 | Caronni |
| 7,358,434 B2 | 4/2008 | Plastina |
| 7,360,084 B1 | 4/2008 | Hardjono |
| 7,363,314 B2 | 4/2008 | Picker |
| 7,382,586 B2 | 6/2008 | Cross |
| 7,383,329 B2 | 6/2008 | Erickson |
| 7,383,586 B2 | 6/2008 | Cross et al. |
| 7,392,212 B2 | 6/2008 | Hancock |
| 7,403,769 B2 | 7/2008 | Kopra |
| 7,415,181 B2 | 8/2008 | Greenwood |
| 7,434,247 B2 | 10/2008 | Dudkiewicz |
| 7,455,590 B2 | 11/2008 | Hansen |
| 7,457,862 B2 | 11/2008 | Hepworth et al. |
| 7,457,864 B2 | 11/2008 | Hepworth |
| 7,457,946 B2 | 11/2008 | Hind |
| 7,478,323 B2 | 1/2009 | Dowdy |
| 7,492,371 B2 | 2/2009 | Jeffrey |
| 7,493,572 B2 | 2/2009 | Card |
| 7,499,630 B2 | 3/2009 | Koch |
| 7,505,959 B2 | 3/2009 | Kaiser |
| 7,546,254 B2 | 6/2009 | Bednarek |
| 7,558,559 B2 | 7/2009 | Alston |
| 7,568,213 B2 | 7/2009 | Carhart |
| 7,571,121 B2 | 8/2009 | Bezos |
| 7,571,183 B2 | 8/2009 | Renshaw |
| 7,574,422 B2 | 8/2009 | Guan |
| 7,574,513 B2 | 8/2009 | Dunning |
| 7,580,932 B2 | 8/2009 | Plastina |
| 7,581,101 B2 | 8/2009 | Ahtisaari |
| 7,599,847 B2 | 10/2009 | Block |
| 7,599,906 B2 | 10/2009 | Kashiwagi |
| 7,599,950 B2 | 10/2009 | Walther |
| 7,644,077 B2 | 1/2010 | Picker |
| 7,647,613 B2 | 1/2010 | Drakoulis |
| 7,657,224 B2 | 2/2010 | Goldberg |
| 7,657,493 B2 | 2/2010 | Meijer |
| 7,680,849 B2 | 3/2010 | Heller |
| 7,685,204 B2 | 3/2010 | Rogers |
| 7,690,026 B2 | 3/2010 | Zhu |
| 7,693,887 B2 | 4/2010 | McLaughlin |
| 7,720,871 B2 | 5/2010 | Rogers |
| 7,725,494 B2 | 5/2010 | Rogers |
| 7,734,569 B2 | 6/2010 | Martin |

(56) References Cited

U.S. PATENT DOCUMENTS

| | | | |
|---|---|---|---|
| 7,739,723 | B2 | 6/2010 | Rogers |
| 7,747,620 | B2 | 6/2010 | Beaupre |
| 7,801,896 | B2 | 9/2010 | Szabo |
| 7,818,350 | B2 | 10/2010 | New |
| 7,831,199 | B2 | 11/2010 | Ng |
| 7,840,570 | B2 | 11/2010 | Cervera |
| 7,844,498 | B2 | 11/2010 | Robbin |
| 2001/0021914 | A1 | 9/2001 | Jacobi et al. |
| 2001/0042017 | A1 | 11/2001 | Matsukawa |
| 2001/0047272 | A1 | 11/2001 | Frietas et al. |
| 2001/0051925 | A1 | 12/2001 | Kang |
| 2001/0056434 | A1 | 12/2001 | Kaplan |
| 2002/0002510 | A1 | 1/2002 | Sharp |
| 2002/0002899 | A1 | 1/2002 | Gjerdingen |
| 2002/0004413 | A1 | 1/2002 | Nobuhiro |
| 2002/0004743 | A1 | 1/2002 | Kutaragi |
| 2002/0006803 | A1 | 1/2002 | Mendiola et al. |
| 2002/0019829 | A1 | 2/2002 | Shapiro |
| 2002/0042912 | A1 | 4/2002 | Iilima |
| 2002/0052754 | A1 | 5/2002 | Joyce |
| 2002/0059094 | A1 | 5/2002 | Hosea |
| 2002/0059379 | A1 | 5/2002 | Harvey |
| 2002/0061743 | A1 | 5/2002 | Hutcheson |
| 2002/0075305 | A1 | 6/2002 | Beaton et al. |
| 2002/0077130 | A1 | 6/2002 | Owensby |
| 2002/0078006 | A1 | 6/2002 | Shteyn |
| 2002/0082901 | A1 | 6/2002 | Dunning |
| 2002/0082923 | A1 | 6/2002 | Merriman et al. |
| 2002/0083411 | A1 | 6/2002 | Bouthers et al. |
| 2002/0095330 | A1 | 7/2002 | Berkowitz |
| 2002/0111177 | A1 | 8/2002 | Castres |
| 2002/0128029 | A1 | 9/2002 | Nishikawa |
| 2002/0135750 | A1 | 9/2002 | Winkler |
| 2002/0137507 | A1 | 9/2002 | Winkler |
| 2002/0138291 | A1 | 9/2002 | Vaidyanathan et al. |
| 2002/0141403 | A1 | 10/2002 | Akahane |
| 2002/0152117 | A1* | 10/2002 | Cristofalo et al. ............... 705/14 |
| 2002/0164962 | A1 | 11/2002 | Mankins |
| 2002/0174430 | A1 | 11/2002 | Ellis |
| 2002/0178223 | A1 | 11/2002 | Bushkin |
| 2002/0178276 | A1 | 11/2002 | McCartney |
| 2002/0180345 | A1 | 12/2002 | Emmerson |
| 2002/0194215 | A1 | 12/2002 | Cantrell |
| 2003/0003929 | A1 | 1/2003 | Himmel et al. |
| 2003/0003935 | A1 | 1/2003 | Vesikivi et al. |
| 2003/0018797 | A1 | 1/2003 | Dunning et al. |
| 2003/0033321 | A1 | 2/2003 | Schrempp |
| 2003/0037068 | A1 | 2/2003 | Thomas |
| 2003/0040297 | A1 | 2/2003 | Pecen et al. |
| 2003/0040300 | A1 | 2/2003 | Bodic et al. |
| 2003/0055689 | A1 | 3/2003 | Block |
| 2003/0064757 | A1 | 4/2003 | Yamadera et al. |
| 2003/0065757 | A1 | 4/2003 | Yamadera |
| 2003/0083108 | A1 | 5/2003 | King |
| 2003/0097379 | A1 | 5/2003 | Ireton |
| 2003/0101126 | A1 | 5/2003 | Cheung |
| 2003/0120630 | A1 | 6/2003 | Tunkelang |
| 2003/0126015 | A1 | 7/2003 | Chan et al. |
| 2003/0144022 | A1 | 7/2003 | Hatch |
| 2003/0154300 | A1 | 8/2003 | Mostafa |
| 2003/0163369 | A1 | 8/2003 | Arr |
| 2003/0182567 | A1 | 9/2003 | Barton et al. |
| 2003/0185356 | A1 | 10/2003 | Katz |
| 2003/0187749 | A1* | 10/2003 | Peled et al. ..................... 705/26 |
| 2003/0188017 | A1 | 10/2003 | Nomura |
| 2003/0191689 | A1 | 10/2003 | Bosarge et al. |
| 2003/0195039 | A1 | 10/2003 | Orr |
| 2003/0197719 | A1 | 10/2003 | Lincke et al. |
| 2003/0203731 | A1 | 10/2003 | King |
| 2003/0212710 | A1 | 11/2003 | Guy |
| 2003/0220866 | A1 | 11/2003 | Pisaris-Henderson |
| 2003/0229537 | A1 | 12/2003 | Dunning |
| 2004/0002933 | A1 | 1/2004 | Toussaint |
| 2004/0003392 | A1 | 1/2004 | Trajkovic |
| 2004/0003398 | A1 | 1/2004 | Donian et al. |
| 2004/0032393 | A1 | 2/2004 | Brandenberg |
| 2004/0032434 | A1 | 2/2004 | Pinsky et al. |
| 2004/0043777 | A1 | 3/2004 | Brouwer et al. |
| 2004/0043790 | A1 | 3/2004 | Ben-David |
| 2004/0045029 | A1 | 3/2004 | Matsuura |
| 2004/0045030 | A1 | 3/2004 | Reynolds |
| 2004/0054576 | A1 | 3/2004 | Kanerva et al. |
| 2004/0063449 | A1 | 4/2004 | Fostick |
| 2004/0068460 | A1 | 4/2004 | Feeley |
| 2004/0068552 | A1 | 4/2004 | Kotz |
| 2004/0073924 | A1 | 4/2004 | Pendakur |
| 2004/0092248 | A1 | 5/2004 | Kelkar |
| 2004/0093289 | A1 | 5/2004 | Bodin |
| 2004/0128286 | A1 | 7/2004 | Yasushi |
| 2004/0136358 | A1 | 7/2004 | Hind et al. |
| 2004/0137987 | A1 | 7/2004 | Nguyen |
| 2004/0139064 | A1 | 7/2004 | Chevallier |
| 2004/0143667 | A1 | 7/2004 | Jerome et al. |
| 2004/0148424 | A1 | 7/2004 | Berkson |
| 2004/0152518 | A1 | 8/2004 | Kugo |
| 2004/0158860 | A1 | 8/2004 | Crow |
| 2004/0162738 | A1 | 8/2004 | Sanders |
| 2004/0185883 | A1 | 9/2004 | Rukman |
| 2004/0186789 | A1 | 9/2004 | Nakashima |
| 2004/0192359 | A1 | 9/2004 | McRaild et al. |
| 2004/0194128 | A1 | 9/2004 | McIntyre |
| 2004/0198403 | A1 | 10/2004 | Pedersen |
| 2004/0203761 | A1 | 10/2004 | Baba et al. |
| 2004/0203851 | A1 | 10/2004 | Vetro et al. |
| 2004/0204133 | A1 | 10/2004 | Andrew et al. |
| 2004/0204145 | A1 | 10/2004 | Shoichi |
| 2004/0209649 | A1 | 10/2004 | Lord |
| 2004/0215793 | A1 | 10/2004 | Ryan |
| 2004/0233224 | A1 | 11/2004 | Akio |
| 2004/0240649 | A1 | 12/2004 | Goel |
| 2004/0240861 | A1 | 12/2004 | Yeend |
| 2004/0259526 | A1 | 12/2004 | Goris et al. |
| 2004/0267715 | A1 | 12/2004 | Polson |
| 2005/0010641 | A1 | 1/2005 | Staack |
| 2005/0018853 | A1 | 1/2005 | Lain et al. |
| 2005/0021395 | A1 | 1/2005 | Luu |
| 2005/0021470 | A1 | 1/2005 | Martin |
| 2005/0033700 | A1 | 2/2005 | Vogler |
| 2005/0050208 | A1 | 3/2005 | Chatani |
| 2005/0060350 | A1 | 3/2005 | Baum |
| 2005/0060425 | A1 | 3/2005 | Yeh et al. |
| 2005/0075908 | A1 | 4/2005 | Stevens |
| 2005/0086697 | A1 | 4/2005 | Haseltine |
| 2005/0091146 | A1 | 4/2005 | Levinson |
| 2005/0091381 | A1 | 4/2005 | Sunder |
| 2005/0102610 | A1 | 5/2005 | Jie |
| 2005/0114357 | A1 | 5/2005 | Chengalvarayan |
| 2005/0119936 | A1 | 6/2005 | Buchanan |
| 2005/0125397 | A1 | 6/2005 | Gross et al. |
| 2005/0138369 | A1 | 6/2005 | Lebovitz |
| 2005/0141709 | A1 | 6/2005 | Bratton |
| 2005/0154608 | A1 | 7/2005 | Paulson |
| 2005/0160458 | A1 | 7/2005 | Baumgartner |
| 2005/0193014 | A1 | 9/2005 | Prince |
| 2005/0193054 | A1 | 9/2005 | Wilson |
| 2005/0195696 | A1 | 9/2005 | Rekimoto |
| 2005/0203807 | A1 | 9/2005 | Bezos et al. |
| 2005/0210009 | A1* | 9/2005 | Tran ..................................... 707/3 |
| 2005/0210101 | A1 | 9/2005 | Janik |
| 2005/0216341 | A1 | 9/2005 | Agarwal |
| 2005/0216859 | A1 | 9/2005 | Paek |
| 2005/0222989 | A1 | 10/2005 | Haveliwala |
| 2005/0223039 | A1 | 10/2005 | Kim |
| 2005/0228680 | A1 | 10/2005 | Malik |
| 2005/0234891 | A1 | 10/2005 | Walther |
| 2005/0235811 | A1 | 10/2005 | Dukane |
| 2005/0239504 | A1 | 10/2005 | Ishii et al. |
| 2005/0249216 | A1 | 11/2005 | Jones |
| 2005/0256867 | A1 | 11/2005 | Walther |
| 2005/0273465 | A1 | 12/2005 | Kimura |
| 2005/0276570 | A1 | 12/2005 | Reed, Jr. |
| 2005/0289113 | A1 | 12/2005 | Bookstaff |
| 2006/0015904 | A1* | 1/2006 | Marcus ........................... 725/46 |
| 2006/0018208 | A1 | 1/2006 | Nathan |

(56) References Cited

U.S. PATENT DOCUMENTS

| | | |
|---|---|---|
| 2006/0018209 A1 | 1/2006 | Drakoulis et al. |
| 2006/0020062 A1 | 1/2006 | Bloom |
| 2006/0020662 A1 | 1/2006 | Robinson |
| 2006/0026263 A1 | 2/2006 | Raghavan |
| 2006/0031164 A1 | 2/2006 | Jea-Un |
| 2006/0031327 A1 | 2/2006 | Kredo |
| 2006/0037039 A1 | 2/2006 | Aaltonen |
| 2006/0048059 A1 | 3/2006 | Etkin |
| 2006/0059044 A1 | 3/2006 | Chan |
| 2006/0062094 A1 | 3/2006 | Nathan |
| 2006/0067296 A1 | 3/2006 | Bershad |
| 2006/0068845 A1 | 3/2006 | Muller et al. |
| 2006/0074750 A1 | 4/2006 | Clark |
| 2006/0075425 A1 | 4/2006 | Koch et al. |
| 2006/0080356 A1 | 4/2006 | Burges |
| 2006/0091203 A1 | 5/2006 | Bakker |
| 2006/0095511 A1 | 5/2006 | Munarriz et al. |
| 2006/0095516 A1 | 5/2006 | Wijeratne |
| 2006/0100978 A1 | 5/2006 | Heller |
| 2006/0106936 A1 | 5/2006 | De Luca |
| 2006/0112098 A1 | 5/2006 | Renshaw et al. |
| 2006/0117378 A1 | 6/2006 | Tam et al. |
| 2006/0123014 A1 | 6/2006 | Ng |
| 2006/0123052 A1 | 6/2006 | Robbin et al. |
| 2006/0129455 A1 | 6/2006 | Shah |
| 2006/0136344 A1 | 6/2006 | Jones |
| 2006/0141923 A1 | 6/2006 | Goss |
| 2006/0143236 A1 | 6/2006 | Wu |
| 2006/0155732 A1 | 7/2006 | Momose |
| 2006/0165571 A1 | 7/2006 | Seon et al. |
| 2006/0168616 A1 | 7/2006 | Candelore |
| 2006/0173910 A1 | 8/2006 | McLaughlin |
| 2006/0173916 A1 | 8/2006 | Sibley |
| 2006/0194595 A1 | 8/2006 | Myllynen et al. |
| 2006/0195462 A1 | 8/2006 | Rogers |
| 2006/0195513 A1 | 8/2006 | Rogers et al. |
| 2006/0195514 A1 | 8/2006 | Rogers et al. |
| 2006/0195515 A1 | 8/2006 | Beaupre |
| 2006/0195516 A1 | 8/2006 | Beaupre |
| 2006/0195521 A1 | 8/2006 | New et al. |
| 2006/0195789 A1 | 8/2006 | Rogers |
| 2006/0195790 A1 | 8/2006 | Beaupre |
| 2006/0200460 A1 | 9/2006 | Meyerzon et al. |
| 2006/0200461 A1 | 9/2006 | Lucas et al. |
| 2006/0204601 A1 | 9/2006 | Palu |
| 2006/0206586 A1 | 9/2006 | Ling et al. |
| 2006/0224971 A1* | 10/2006 | Paulin et al. .............. 715/758 |
| 2006/0242129 A1 | 10/2006 | Libes |
| 2006/0253874 A1 | 11/2006 | Stark |
| 2006/0276170 A1 | 12/2006 | Radhakrishnan et al. |
| 2006/0276213 A1 | 12/2006 | Gottschalk et al. |
| 2006/0277098 A1 | 12/2006 | Chung |
| 2006/0282311 A1 | 12/2006 | Jiang |
| 2006/0286963 A1 | 12/2006 | Koskinen et al. |
| 2006/0286964 A1 | 12/2006 | Polanski et al. |
| 2006/0288044 A1 | 12/2006 | Kashiwagi et al. |
| 2006/0288124 A1 | 12/2006 | Kraft et al. |
| 2006/0288367 A1 | 12/2006 | Swix |
| 2007/0003064 A1 | 1/2007 | Wiseman |
| 2007/0004333 A1 | 1/2007 | Kavanti |
| 2007/0016507 A1 | 1/2007 | Tzara |
| 2007/0043829 A1 | 2/2007 | Dua |
| 2007/0047523 A1 | 3/2007 | Jiang |
| 2007/0055439 A1 | 3/2007 | Denker |
| 2007/0055440 A1 | 3/2007 | Denker |
| 2007/0061568 A1 | 3/2007 | Lee |
| 2007/0072631 A1 | 3/2007 | Mock et al. |
| 2007/0073596 A1* | 3/2007 | Alexander et al. .............. 705/26 |
| 2007/0074262 A1 | 3/2007 | Kikkoji et al. |
| 2007/0083602 A1 | 4/2007 | Heggenhougen et al. |
| 2007/0088687 A1 | 4/2007 | Bromm et al. |
| 2007/0088801 A1 | 4/2007 | Levkovitz et al. |
| 2007/0088851 A1 | 4/2007 | Levkovitz et al. |
| 2007/0100690 A1 | 5/2007 | Hopkins |
| 2007/0100805 A1 | 5/2007 | Ramer et al. |
| 2007/0105536 A1 | 5/2007 | Tingo |
| 2007/0106899 A1 | 5/2007 | Hideyuki |
| 2007/0113243 A1 | 5/2007 | Brey |
| 2007/0117571 A1 | 5/2007 | Musial |
| 2007/0118546 A1 | 5/2007 | Acharya |
| 2007/0136264 A1 | 6/2007 | Tran |
| 2007/0149208 A1 | 6/2007 | Syrbe et al. |
| 2007/0156677 A1 | 7/2007 | Szabo |
| 2007/0157247 A1 | 7/2007 | Cordray et al. |
| 2007/0161402 A1 | 7/2007 | Ng |
| 2007/0202922 A1 | 8/2007 | Myllynen |
| 2007/0203790 A1* | 8/2007 | Torrens et al. .............. 705/14 |
| 2007/0204061 A1 | 8/2007 | Chen |
| 2007/0244880 A1 | 10/2007 | Martin |
| 2007/0250429 A1 | 10/2007 | Walser |
| 2007/0250761 A1 | 10/2007 | Bradley |
| 2007/0271286 A1 | 11/2007 | Purang |
| 2007/0290787 A1 | 12/2007 | Fiatal et al. |
| 2007/0294096 A1 | 12/2007 | Randall |
| 2008/0004046 A1 | 1/2008 | Mumick et al. |
| 2008/0004948 A1 | 1/2008 | Flake |
| 2008/0004990 A1 | 1/2008 | Flake |
| 2008/0013537 A1 | 1/2008 | Dewey et al. |
| 2008/0027881 A1 | 1/2008 | Bisse |
| 2008/0032703 A1 | 2/2008 | Krumm et al. |
| 2008/0032717 A1 | 2/2008 | Sawada et al. |
| 2008/0046317 A1 | 2/2008 | Christianson |
| 2008/0057917 A1 | 3/2008 | Oria |
| 2008/0070579 A1 | 3/2008 | Kankar et al. |
| 2008/0071875 A1 | 3/2008 | Koff et al. |
| 2008/0077264 A1 | 3/2008 | Irvin |
| 2008/0082467 A1 | 4/2008 | Meijer et al. |
| 2008/0082686 A1 | 4/2008 | Schmidt et al. |
| 2008/0123856 A1 | 5/2008 | Won |
| 2008/0130547 A1 | 6/2008 | Won |
| 2008/0132215 A1 | 6/2008 | Soderstrom |
| 2008/0133601 A1 | 6/2008 | Cervera |
| 2008/0155057 A1 | 6/2008 | Khedouri |
| 2008/0155588 A1 | 6/2008 | Roberts |
| 2008/0195468 A1 | 8/2008 | Malik |
| 2008/0220855 A1 | 9/2008 | Chen |
| 2008/0243619 A1 | 10/2008 | Sharman et al. |
| 2008/0270221 A1 | 10/2008 | Clemens |
| 2008/0294523 A1 | 11/2008 | Little |
| 2008/0301303 A1 | 12/2008 | Matsuoka |
| 2009/0024504 A1 | 1/2009 | Lerman |
| 2009/0024510 A1 | 1/2009 | Chen |
| 2009/0073174 A1 | 3/2009 | Berg |
| 2009/0076939 A1 | 3/2009 | Berg |
| 2009/0076974 A1 | 3/2009 | Berg et al. |
| 2009/0083307 A1 | 3/2009 | Cervera et al. |
| 2009/0089222 A1 | 4/2009 | Ferreira de Castro |
| 2009/0106085 A1 | 4/2009 | Raimbeault |
| 2009/0210415 A1 | 8/2009 | Martin |
| 2009/0275315 A1 | 11/2009 | Alston |
| 2009/0276368 A1 | 11/2009 | Martin |
| 2010/0161595 A1 | 6/2010 | Martin |
| 2010/0169328 A1 | 7/2010 | Hangartner |

FOREIGN PATENT DOCUMENTS

| | | |
|---|---|---|
| DE | 10061984 | 6/2002 |
| EP | 0831629 | 3/1998 |
| EP | 1 050 833 A2 | 8/2000 |
| EP | 1043905 | 10/2000 |
| EP | 1073293 | 1/2001 |
| EP | 1083504 | 3/2001 |
| EP | 1107137 | 6/2001 |
| EP | 1109371 | 6/2001 |
| EP | 1195701 | 4/2002 |
| EP | 1220132 | 7/2002 |
| EP | 1 231 788 A1 | 8/2002 |
| EP | 1239392 | 9/2002 |
| EP | 1280087 | 1/2003 |
| EP | 1320214 | 6/2003 |
| EP | 1365604 | 11/2003 |
| EP | 1408705 | 4/2004 |
| EP | 1420388 A1 | 4/2004 |
| EP | 1455511 | 9/2004 |

(56) References Cited

FOREIGN PATENT DOCUMENTS

| | | |
|---|---|---|
| EP | 1509024 | 2/2005 |
| EP | 1528827 | 5/2005 |
| EP | 1 548 741 A1 | 6/2005 |
| EP | 1542482 | 6/2005 |
| EP | 1587332 | 10/2005 |
| EP | 1615455 | 1/2006 |
| EP | 1633100 | 3/2006 |
| EP | 1677475 | 7/2006 |
| EP | 1772822 | 4/2007 |
| GB | 2369218 | 5/2002 |
| GB | 2372867 | 9/2002 |
| GB | 2380364 | 4/2003 |
| GB | 2386509 | 9/2003 |
| GB | 2406996 | 4/2005 |
| GB | 2414621 | 11/2005 |
| GB | 2416887 | 2/2006 |
| GB | 2424546 | 9/2006 |
| JP | 11-052965 | 2/1999 |
| JP | 2002-108351 A | 4/2002 |
| JP | 2002/140272 | 5/2002 |
| JP | 2002-320203 A | 10/2002 |
| JP | 2003-16093 | 1/2003 |
| JP | 2003-023586 | 1/2003 |
| JP | 2003-244671 | 8/2003 |
| JP | 2003-0255958 A | 9/2003 |
| JP | 2004-221999 A | 8/2004 |
| JP | 2005-027337 A | 1/2005 |
| JP | 2005-510970 | 4/2005 |
| JP | 2005-165632 | 6/2005 |
| JP | 2007-087138 | 4/2007 |
| JP | 2007-199821 | 8/2007 |
| KR | 2002025579 | 4/2002 |
| WO | 89/10610 | 11/1989 |
| WO | 96/24213 | 8/1996 |
| WO | 00/44151 | 7/2000 |
| WO | 00/70848 | 11/2000 |
| WO | 01/22748 | 3/2001 |
| WO | 01/31497 | 5/2001 |
| WO | 01/44977 | 6/2001 |
| WO | 01/50703 | 7/2001 |
| WO | 01/52161 | 7/2001 |
| WO | 01/57705 | 8/2001 |
| WO | 01/58178 | 8/2001 |
| WO | 01/63423 | 8/2001 |
| WO | 01/65411 | 9/2001 |
| WO | 01/69406 | 9/2001 |
| WO | 01/71949 | 9/2001 |
| WO | 01/72063 | 9/2001 |
| WO | 01/91400 | 11/2001 |
| WO | 01/93551 | 12/2001 |
| WO | 01/97539 | 12/2001 |
| WO | 02/09431 | 1/2002 |
| WO | 02/23489 | 3/2002 |
| WO | 02/31624 | 4/2002 |
| WO | 02/35324 | 5/2002 |
| WO | 02/44989 | 6/2002 |
| WO | 02/50632 | 6/2002 |
| WO | 02/054803 | 7/2002 |
| WO | 02/069585 | 9/2002 |
| WO | 02/069651 | 9/2002 |
| WO | 02/075574 | 9/2002 |
| WO | 02/084895 | 10/2002 |
| WO | 02/086664 | 10/2002 |
| WO | 02/091238 | 11/2002 |
| WO | 02/096056 | 11/2002 |
| WO | 02/100121 | 12/2002 |
| WO | 03/015430 | 2/2003 |
| WO | 03/019845 | 3/2003 |
| WO | 03/019913 | 3/2003 |
| WO | 03/024136 | 3/2003 |
| WO | WO 03/036541 A1 | 5/2003 |
| WO | 03/049461 | 6/2003 |
| WO | WO 03/051051 A1 | 6/2003 |
| WO | 03/088690 | 10/2003 |
| WO | 2004/057578 | 7/2004 |
| WO | WO 2004/070538 A2 | 8/2004 |
| WO | 2004/084532 | 9/2004 |
| WO | 2004/086791 | 10/2004 |
| WO | 2004/093044 | 10/2004 |
| WO | 2004/100470 | 11/2004 |
| WO | 2004/100521 | 11/2004 |
| WO | 2004/102993 | 11/2004 |
| WO | 2004/104867 | 12/2004 |
| WO | WO 2005/013114 A1 | 2/2005 |
| WO | 2005/020578 | 3/2005 |
| WO | 2005/029769 | 3/2005 |
| WO | 2005/000766 | 8/2005 |
| WO | 2005/073863 | 8/2005 |
| WO | WO 2005/115107 A2 | 12/2005 |
| WO | 2006/002869 | 1/2006 |
| WO | 2006/005001 | 1/2006 |
| WO | 2006/016189 | 2/2006 |
| WO | 2006/024003 | 3/2006 |
| WO | 2006/027407 | 3/2006 |
| WO | 2006/040749 | 4/2006 |
| WO | WO 2006/052837 A2 | 5/2006 |
| WO | WO 2006/075032 A1 | 7/2006 |
| WO | 2006/093284 | 9/2006 |
| WO | 2006/104895 | 10/2006 |
| WO | 2006/119481 | 11/2006 |
| WO | WO 2006/114451 | 11/2006 |
| WO | 2007/000011 | 1/2007 |
| WO | 2007/002025 | 1/2007 |
| WO | WO 2007/038806 A3 | 4/2007 |
| WO | 2007/060451 | 5/2007 |
| WO | WO 2007/134193 A3 | 5/2007 |
| WO | WO 2007/075622 A2 | 7/2007 |
| WO | 2007/091089 | 8/2007 |
| WO | WO 2007/092053 A1 | 8/2007 |
| WO | 2008/013437 | 1/2008 |
| WO | 2008/024852 | 2/2008 |
| WO | 2008/045867 | 4/2008 |
| WO | 2008/147919 | 12/2008 |
| WO | 2009/088554 | 7/2009 |
| WO | WO 2009/149046 A1 | 12/2009 |

OTHER PUBLICATIONS

Bender, et al., "Newspace: Mass Media and Personal Computing," Proceedings of USENIX, Conference, pp. 329-348 (Summer 1991).
Jon Orwant, "Appraising the User of User Models: Doppelgänger's Interface,"in: A. Kobsa and D. Litman (eds.), Proceeding of the 4th International Conference on User Modeling (1994).
Lazar, N.A.; Bayesian Empirical Likelihood; Technical Report, Carnegi Mellon University, Department of Statistics, 2000; 26 pages.
Hofmann, T. "Unsupervised Learning by Probabilistic Latent Semantic Analysis". Mach. Learn., 42:177-196, 2001.
PolyLens: A Recommender System for Groups of Users; M. O'Connor, D. Cosley, J.A. Konstan, J. Riedl; European Conference on Computer Supported Co-Operative Work at Bonn, Germany; Published 2001; pp. 199-218.
Platt, John C. et al., "Learning a Gaussian Process Prior for Automatically Generating Music Playlists," Microsoft Corporation {platt, cburgess, sswenson, chriswea}@microsoft.com, alcez@cs.berkeley.edu, 2002; pp. 1-9.
Hofmann, T. "Latent Semantic Models for Collaborative Filtering". ACM Transactions on Information Systems, 22:89-115, 2004.
Indyk, P. And Matousek, J. "Low-Distortion Embeddings of Finite Metric Spaces". In Handbook of Discrete and Computational Geometry, pp. 177-196. CRC Press, 2004.
Wolfers, Justin and Zitzewitz, Eric, Prediction Markets, Journal of Economic Perspectives, Spring 2004, pp. 107-126, vol. 18, No. 2.
Platt, John S., "Fasting Embedding of Sparse Music Similarity Graphs," Microsoft Corporation, {jplatt@microsoft.com}; 2004.
Toward alernative metrics of journal impact: a comparison of download and citation data, Johan Bollen, Herbert Van de Sompel, Joan Smith, Rick Luce, Google.com, 2005, pp. 1-2.
Das,A., Datar,M., Garg,A., and Rajaram,S. "Google News Personalization: Scalable Online Collaborative Filtering". In WWW '07: Proceedings of the 16th international conference on World Wide Web, pp. 271-280, New York, NY, USA, 2007. ACM Press.

(56) References Cited

OTHER PUBLICATIONS

Scihira, I. "A Characterization of Singular Graphs". Electronic Journal of Linear Algebra, 16:451-462, 2007.
Baluja, S., Seth, R., Sivakumar, D., Jing, Y., Yagnik, J., Kumar, S., Ravichandran, D., and Aly, M. "Video Suggestion and Discovery for YouTube: Taking Random Walks Through the View Graph". In WWW '08: Proceedings of the 17th international conference on World Wide Web, pp. 895-904, Beijing, China, 2008. ACM Press.
Dean, J. and Ghemawat, S. "MapReduce: Simplified Data Processing on Large Clusters". Commun. ACM, 51(1):107-113, 2008.
John Thompson, "A Graphic Representation of Interaction With the NEXIS News Database," MIT Thesis (May 1983).
Lippman, et al., "News and Movies in the 50 Megabit Living Room," IEEE/IEICE, Global Telecommunications Conference, pp. 1976-1981 (Nov. 15, 1987).
Lie, "The Electronic Broadsheet—All The News That Fits The Display," MIT Master's Thesis, pp. 1-96 (Jun. 1991).
Jonathan L. Orwant, "Doppelgänger: A User Modeling System," MIT Bachelor's Thesis (Jun. 1991).
"Lessons from LyricTimeTM: A Prototype Multimedia System" 4th IEEE ComSoc International Workshop on Multimedia Communications (Apr. 1992).
Delivering Interactive Multimedia Documents over Networks; Shoshana Loeb; IEEE Communications Magazine; May 1992; 8 pages.
"Communications of the ACM" Dec. 1992, vol. 35, No. 12 at pp. 26-28 (Introduction to special issue regarding Workshop on High Performance Information Filtering, Morristown, N.J. Nov. 1991).
Belkins, et al., "Information Filtering and Information Retrieval: Two Sides of the Same Coin?", Communications of the ACM (Dec. 1992).
Architecting Personalized Delivery of Multimedia Information,: Communications of the ACM (Dec. 1992).
Jonathan L. Orwant, "Doppelgänger Goes to School: Machine Learning for User Modeling," MIT Master of Science Thesis (Sep. 1993).
Pachet, Francois, A Taxonomy of Musical Genres, Content-Based Multimedia Information Access Conference (RIAO), Paris, Apr. 2000, 8 pages.
Alvear, Jose, "Risk-Free Trial Streaming Media Delivery Tools," Streaming Media.com; www.streamingmedia.com/article. ap?id=5768, Jun. 30, 2000.
Smart Computing, "The Scoop on File-Sharing Services," Dec. 2000, vol. 11, Issue 12; pp. 30-33 in printed issue. Available at www.smartcomputing.com/editorial/article.asp?article=articles%2F2000%Fs1112%2F08s12.asp.
Carlson et al. "Internet Banking Market Developments and Regulatory Issues In the New Economy: What Changed, and the Challenges for Economic Policy . . . "; May 2001; http://www.occ.gov/netbank/SGEC2000.pdf.
Bender, "Twenty Years of Personalization: All about the Daily Me," Educause Review (Sep./Oct. 2002).
PCT/ES2005/000213 International Preliminary Report on Patentability (Ch II) Report Dated Nov. 15, 2007.
PCT/ES2005/00003 International Preliminary Report on Patentability (Ch II) Report dated May 22, 2007.
www.axcessnews.com/modules/wfsection/article.php?articleid=8327, Web Page, Feb. 24, 2006, Maintenance Fees, Digital Music Sales Triple to $1.1 Billion in 2005.
"Social Networking Meets Music Listening: Mecora Launches Radio 2.0," www.masternewmedia.org/news/2006/04/13/social_networking_meets_music_listening.htm, Apr. 13, 2006.
www.akoo.com/Akoo/, Web Page, Akoo, Pick the Music, Waiting in the line at the Theme Park, Introducing the m-Venue™ platform. Printed from Internet Sep. 7, 2006.
www.ecastinc.com/music_licensing.html, Web Page, ECAST NETWORK, interactive entertainment network, MUSIC/LICENSING. Printed from Internet Sep. 7, 2006.
www.roweinternational.com/jukeboxes_dia.html, Web Page, Digital Internet Access Jukeboxes, Rowe International.
www.touchtunes.com, Web Page, TOUCHTUNES, Turn your ROWE 100A's and 100B's into touch tunes Digital Jukeboxes—BOSE. Printed from internet Sep. 7, 2006.
Jacucci, et al., Integrated Project on Interaction and Presence in Urban Environments. Feb. 9, 2007. Retrieved from the Internet: <URL: http://ipcity.eu/wp-content/uploads/2007/02/D7.1%20-%20Demonstrator%20of%20Large-Scale%20Events%20Application.pdf> see p. 20.
PCT/US2006/034218; USPTO Search Authority; PCT International Search Report; Feb. 9, 2007.
PCT/US2007/068708; International Search Report; May 10, 2007.
PCT/US2006/048330; International Bureau; PCT Search Report; Mar. 20, 2008; 10 pages.
Strands Business Solutions. "Integration Document v.2.0"; Published May 2008; [online retrieved on Jan. 21, 2010] Retrieved from the internet <URL: http://recommender.strands.com/doc/SBS-Integration-Document.pdf>; entire document-18 pages.
Extended European Search Report and Search Report Opinion dated Aug. 5, 2010 for PCT/US2006/003795, Aug. 5, 2010.
"Baugher et al", The Secure Real-Time Transport Protocol (SRTP), Mar. 2004, Network Working Group Request for Comments:3711, p. 1-53.
"Communication Pursuant to Article 94(3) EPC issued Oct. 19, 2009", European Patent Application No. 08 153 258.2 (5 pages), Oct. 19, 2009.
"Communication Pursuant to Article 94(3) EPC dated Feb. 10, 2009", European Patent Office in related European Patent Application No. 07 118 601.9 (3 pages), Feb. 10, 2009.
"Communication Pursuant to Article 94(3) EPC issued Jun. 25, 2009", European Patent Application No. 08 159 331.1 (3 pages), Jun. 25, 2009.
"Digital Rights Management in the Mobile Environment", Y.Raivio &S. Luukkkainen, Proceedings of the International Conference on E-Business and Telecommunication, ICETE 2006, Aug. 7, 2006.
"DRM Architecture Approved Version 2.0", OMA-AD-DRM-V2_0-20060303-A (Open Mobile Alliance, Ltd.), Mar. 3, 2006.
"English translation of First Office Action issued by State Intellectual Property Office of People's Republic of China", Chinese Application No. 200480033236.X (8 pages), Dec. 4, 2009.
"English Translation of First Office Action issued by the Chinese Patent Office", Chinese Application No. 200480019404.X, Aug. 19, 2008.
"European Examination Report dated Nov. 3, 2008", European Patent Application EP 08159333.7, Nov. 3, 2008.
"European Examination Report dated Nov. 3, 2008", European Patent Application No. EP 08159331.1, Nov. 3, 2008.
"European Search Report Nov. 5, 2008", European Patent Application No. EP 08159331.1, Nov. 5, 2008.
"European Search Report dated Apr. 7, 2010", European Patent Application No. EP 10153358.6 (6 pages).
"European Search Report dated Jul. 18, 2008", European Patent Office in related EPO Application No. 08 15 3658, Jul. 18, 2008.
"European Search Report dated Jul. 18, 2008", European Patent Office in related EPO Application No. EP 08 15 3656, Jul. 18, 2008.
"European Search Report dated Jul. 22, 2008", European Patent Office in related EPO Application No. EP 08153651.8, Jul. 22, 2008.
"European Search Report dated Jul. 23, 2008", European Patent Office in related EPO Application No. EP 08153654.2, Jul. 23, 2008.
"European Search Report dated Apr. 18, 2008", European Patent Application No. 08101188.4, Apr. 18, 2008.
"European Search Report dated Mar. 19, 2008", European Patent Office in counterpart European Application No. EP 07 11 8601, Mar. 19, 2008.
"Extended European Search Report dated Dec. 2, 2008", European Patent Office in counterpart EPO Application No. EP 07120620.5, Dec. 2, 2008.
"Extended European Search Report dated Dec. 29, 2008", European Patent Office in counterpart EPO Application EP 07120480.4, Dec. 29, 2008.
"Ghassan Chaddoud et al.", Dynamic Group Communication Security, pp. 49-56, IEEE 2001, 2001.

(56) References Cited

OTHER PUBLICATIONS

"International Search Report and Written Opinion of the International Search Authority", International Patent Application No. PCT/EP2008/051229, May 8, 2008.
"International Search Report and Written Opinion of the International Search Authority", International Application PCT/EP2008/054911, Nov. 11, 2008.
"International Search Report for International Application", PCT/FI2006/050467, dated Jul. 25, 2007.
"International Search Report in PCT Application No. PCT/GB2004/003890", Apr. 5, 2005.
"Office Action", U.S. Appl. No. 12/002,452 (20 pages), Apr. 9, 2009.
"Office Action dated Jan. 28, 2009 in U.S. Appl. No. 10/571,709", Jan. 28, 2009.
"Office Action dated Mar. 22, 2010", U.S. Appl. No. 12/431,961 (19 pages), Mar. 22, 2010.
"Office Action dated Apr. 6, 2009 in related U.S. Appl. No. 12/156,335 (17 pages)", Apr. 6, 2009.
"Office Action dated Jun. 21, 2010", U.S. Appl. No. 10/555,543 (17 pages), Jun. 21, 2010.
"Office Action dated Apr. 6, 2009", U.S. Appl. No. 10/555,543 (14 pages), Apr. 6, 2009.
"Office Action dated Feb. 5, 2009", U.S. Appl. No. 12/079,312 (12 pages), Feb. 5, 2009.
"Office Action dated Mar. 9, 2011", Issued in related U.S. Appl. No. 12/477,766 (27 pages).
"Office Action from British Intellectual Property Office", British Application No. GB0712281.5 (5 pages), Oct. 9, 2008.
"Office Action issued Apr. 22, 2010", U.S. Appl. No. 12/156,335 (16 pages), Apr. 22, 2010.
"Office Action issued by USPTO dated Nov. 20, 2009", U.S. Appl. No. 10/571,709 (20 pages), Nov. 20, 2009.
"Office Action issued from the USPTO dated Nov. 4, 2010", U.S. Appl. No. 12/431,961 (22 pages), Nov. 4, 2010.
"Office Action issued from the USPTO dated Aug. 14, 2009", U.S. Appl. No. 12/431,961 (12 pages), Aug. 14, 2009.
"Office Action issued from the USPTO dated Sep. 23, 2009", U.S. Appl. No. 12/156,335 (19 pages), Sep. 23, 2009.
"Office Action issued from USPTO", in related U.S. Appl. No. 10/555,543 (29 pages), Oct. 20, 2009.
"Office Action Issued from USPTO dated Oct. 5, 2009", U.S. Appl. No. 10/571,709 (26 pages), Oct. 5, 2009.
"Office Action Issued Jan. 12, 2011 by the USPTO", U.S. Appl. No. 12/484,454 (10 pages).
"Office Action Mar. 24, 2009", U.S. Appl. No. 12/156,335, Mar. 24, 2009.
"Official Action from the European Patent Office", European Application No. 08 717 428.0 (4 pages), Apr. 1, 2009.
Final Office Action, Japanese Patent Office, Application No. 2008-533798, filed Oct. 2, 2006, 48 pages.
"PCT International Search Report (Form PCT/ISA/210)", International Application PCT/EP2008/052678, Jul. 4, 2008.
"PCT International Search Report dated Mar. 25, 2008", PCT Application No. PCT/US2006/38769, Mar. 25, 2008, (3 pages).
"PCT International Search Report issued by PCT International Searching Authority", International Searching Authority in connection with the related PCT International Application No. PCT/NL2004/000335 (2 pages), Sep. 24, 2004.
"PCT Written Opinion of the International Preliminary Examining Authority dated Mar. 19, 2007", PCT Application No. PCT/ES2005/00003, Mar. 19, 2007.
"PCT Written Opinion of the International Searching Authority dated Jan. 12, 2006", PCT Application No. PCT/ES2005/000213, Jan. 12, 2006.
"Schulzrinne et al, "RTP: A Transport Protocol for Real-Time Applications"", Network Working Group Request for Comments: 3550, p. 1-98, Jul. 1, 2003.
"Search Report under Section 17 dated May 20, 2008", British Patent Office in counterpart UK Application No. GB0807153.2, May 20, 2008.
"Text of Second Office Action (English Translation)", Jun. 12, 2009 in corresponding Chinese Patent Application No. 2004800194040.X (2 pages).
"Treemap", Treemap, University of Maryland, hhttp://www.cs.umd/hcil/treemap/, last updated Aug. 5, 2003, 4 pages, Aug. 5, 2003, 4 Pages.
"U.K. Combined Search and Examination Report under Sections 17 and 18(3)", U.K. Application No. GB0802177.6, May 13, 2008.
"U.K. Further Search Report under Section 17", U.K. Application No. GB0710853.3, Dec. 5, 2007.
"U.K. Search Report under Section 17", U.K. Application No. GB0710853.3, Oct. 3, 2007.
"U.K. Search Report under Section 17 dated Mar. 3, 2005", U.K. Application Serial No. GB0420339.4, Mar. 3, 2005.
"United Kingdom Search Report under Section 17", GB 0712281.5 (2 pages), Oct. 24, 2007.
"Wallner et al, "Key Management for Multicast: Issues and Architectures"", Jun. 1999, National Security Agency Networking Group Request for Comments: 2627, p. 1-22 (22 pages), Jun. 1, 1999.
Alvear, Jose, Jose Alvear, Jun. 30, 2000, www.streamingmeadia.com/aticle.ap?id=5768, Streaming media.com, "Risk-Free Trial Streaming Media Delivery Tools", Jun. 30, 2000.
Aucouturier J et al: "Scaling up music playlist generation", Multimedia and Expo, 2002. ICME '02. Proceedings. 2002 IEEE International Conference on Lausanne, Switzerland Aug. 26-29, 2002, Piscataway, NJ, USA, IEE, US, vol. 1, Aug. 2002, pp. 105, Aug. 26, 2002, 105-108.
Cano, Pedro et al., "On the Use of FastMap for Audio Retrieval and Browsing", Cano, Pedro et al., On the Use of FastMap for Audio Retrieval and Browsing, The International Conference on Music Information Retrieval and Related Activities (ISMIR 2002), Paris, France, Oct. 2002, 2 pages, 2002.
Connell, Lain et al., "Ontological Sketch Models: Highlighting User-System Misfits", Connell, Iain et al., Ontological Sketch Models: Highlighting User-System Misfits, In P. Palanque, E. O'Neill and P. Johnson, editors, Proceedings of Human Computer Interaction (HCI) Bath, England, Sep. 2003, London Springer, pp. 1-16, Sep. 2003, 1-16.
Levine, Robert, "New Model For Sharing: Free Music with Ads", The New York Times (On-Line Edition), Apr. 23, 2007.
Logan, Beth, "A Music Similarity Function Based on Signal Analysis", Logan, Beth et al., A Music Similarity Function Based on Signal Analysis, IEEE International Conference on Multimedia and Expo (ICME), Tokyo, Japan, Aug. 2001, IEEE Press, pp. 952-955., Aug. 2001, 952-955.
Logan, Beth, "Content-Based Playlist Generation: Exploratory Experiments", Logan, Beth, Content-Based Playlist Generation: Exploratory Experiments, The International Conference on Music Information Retrieval and Related Activities (ISMIR 2002), Paris, France, Oct. 2002, 2 pages, Oct. 2002.
Maidin, Donncha et al., "The Best of Two Worlds: Retrieving and Browsing", Maidin, Donncha 0 et al., The Best of Two Worlds: Retrieving and Browsing, Proceedings of the COST G-6 Conference on Digital Audio Effects (DAFX-OO), Verona, Italy, Dec. 7-9, 2000, 4 pages, Dec. 2000.
Notess, Mark et al., Notess, Mark et al., Variations2: Toward Visual Interface for Digital Music Libraries, Second International Workshop on Visual Interfaces to Digital Libraries, 2002, 6 pages, 2002.
Pampalk, Elias et al., "Content-based Organization and Visualization of Music Archives", Pampalk, Elias et al., Content-based Organization and Visualization of Music Archives, ACM Multimedia, Juan les Pins, France, Dec. 2002, pp. 570-579, Dec. 2002, 570-579.
Pauws, Steffen et al., "PATS: Realization and User Evaluation of an Automatic Playlist Generator", Pauws, Steffen et al., PATS: Realization and User Evaluation of an Automatic Playlist Generator, The International Conferences on Music Information Retrieval and Related Activities (ISMIR 2002), Paris, France, Oct. 2002, 9 pages., Oct. 2002.
Rauber, Andreas et al., "The SOM-enhanced JukeBox: Organization and visualization of Music Collections Based on Perceptual Models", Rauber, Andreas et al., The SOM-enhanced JukeBox: Organization

(56) References Cited

OTHER PUBLICATIONS and Visualization of Music Collections Based on Perceptual Models, Journal of New Music Research, vol. 32, Nov. 2, 2003, pp. 193-210., Nov. 2, 2003, 193-210.

Shneiderman, Ben, "Tree Visualization with Tree-Maps: 2-d-Space-Filing Approach", Schneiderman, Ben, Tree Visualization with Tree-Maps: 2-d Space-Filling Approach, ACM Transactions on Graphics, vol. 11, No. 1, Jan. 1992, pp. 92-99, 1992, pp. 92-99.

Shneiderman, Ben, "Treemaps for Space-Contrained Visualization of Hierarchies", Schneiderman, Ben, Treemaps for Space-Contrained Visualization of Hierarchies, http://www.sc.umd.edu/heil/treemap-history, last updated Apr. 28, 2006, 16 pages, Apr. 28, 2006.

Tzanetakis, George et al., "A Prototype Audio Browser-Editor Using a Large Scale Immersive Visual and Audio Display", Tzanetakis, George et al., MARSYAS3D: A Prototype Audio Browser-Editor Using a Large Scale Immersive Visual and Audio Display, Proceedings of the 2001 International Conference on Auditory Display, Espoo, Finland, Jul./Aug. 2001, 5 pages, 2001.

Yen, Yi-Wyn, "Apple announces a 32GB iPhone 3G by Jun. 15, 2009", Yen, Yi-Wyn, Apple announces a 32GB iPhone 3G by Jun. 15, 2009, The Industry Standard, Apr. 2, 2009, http://www.thestandard.com/preditions/channel/hardware, downloaded Apr. 8, 2009, Apr. 2, 2009.

Apple: iTunes 4.2 User Guide for Windows; Dec. 2003; retrieved from the internet: URL: http://www2.austin.cc.tx.us/tcm/projects/itunes.pdf; pp. 10, 17-19.

Deshpande, Mukund, et al., "Item-Based Top-N. Recommendation Algorithms," ACM Transactions on Information Systems, vol. 22, No. 1; Jan. 2004; pp. 143-177.

www.bmi.com/news/200403/20040324b.asp, Web Page, BMI™ Figures Don'T Lie, Mar. 24, 2004, Touch Tunes Signs License Agreement for BMI Music in Digital Jukeboxes.

www.rfidjournal.com/article/articleview/1619/1/1, Web Page, RFID brings messages to Seattle side walks on RFID system being deployed next week will send marketing and assistive information to users carrying active RFID tags. RFID Journal, Dated May 26, 2004; 4 pages.

Tom Bunzel, "Easy Digital Music," QUE Publisher, Aug. 18, 2004, Chapters 5 and 8.

Chao-Ming et al. (Chao-Ming), Design and Evaluation and mProducer: a Mobile Authoring Tool for Personal Experience Computing [online], MUM 2004, College Park, Maryland, USA, Oct. 27-29, 2004 [retrieved on Dec. 17, 2010]. [http://citeseerx.ist.psu.edu/viewdoc/download?doi=10.1.1.131.2933&rep=rep1&type=pdf].

Augmenting the Social Space of an Academic Conference; McCarthy, et al. Information School, University of Washington and Department of Computer Science and Engineering, University of Minnesota; pp. 1-10; Nov. 6-10, 2004. Retrieved from the internet: <URL: http://interrelativity.com/joe/publications/ProactiveDisplays-CSCW2004.pdf> entire document.

Toward University Mobile Interaction for Shared Displays; Tim Paek, et al.; Microsoft Research, Redmond, WA; pp. 1-4; Nov. 6-10, 2004. Retrieved from the internet: <URL: http://research.microsoft.com/~timpaek/Papers/cscw2004. pdf> entire document.

The Trustees of Indiana University, Variations2, The Indiana University Digital Music Library, http://dml.indiana.edu/, last updated May 11, 2005, 1 page.

PCT/ES2005/00003 Written Opinion of the International Searching Authority Report dated Jun. 10, 2005.

"New Music Recommendation System is Based on FOAG Personal Profiling," www.masternewmedia.org/music_recommendation/music_recommendation_system_FOAF, Oct. 1, 2005.

Co-Construction of Hybrid Spaces; Asa Rudstrom; A Dissertation submitted to the University of Stockholm in partial fulfillment of the requirements for the Degree of Doctor of Philosophy; Department of Computer and Systems Sciences Stockholm University and Royal Institute of Technology; pp. 1-69; Nov. 2005. Retrieved from the Internet: <URL:http://www.sics.se/~asa/Thesis/CoverPaper.pdf> entire document.

www.alwayson-network.com/comments.php?id=P12663 0 37 0 C, Web Page, Not Your Average Jukebox, On Hollywood 1000 contender Ecast uses broadbank to being the digital media experience to your watering hole. Posted Nov. 4, 2005.

MobiLenin—Combining A Multi-Track Music Video, Personal Mobile Phones and a Public Display into Multi-User Interactive Entertainment; Jurgen Scheible, et al. Media Lab, University of Art and Design, Helsinki, Finland; pp. 1-10; Nov. 6-10, 2005. Retrieved from the internet: <URL:http://www.mediateam.oulu/fipublications/pdf1660.pdf> entire document.

PCT/US2006/003795; International Search Report for International Application, dated May 28, 2008.

Incremental tensor analysis: theory and applications, Jimeng Sun, Dacheng Tao, Spiros Papadimitriou, Philip Yu, Christos Faloutsos, ACM, Oct. 2008, pp. 1-37.

ShopSmart: Product Recommendations through Technical Specifications and User Reviews; Alexander Yates et al. Temple University; CIKM; Oct. 26-30, 2008, Napa Valley, CA, USA; 2 pages.

PCT/US07/068708; Filed May 10, 2007; International Search Report; WO 2007/134193; Dec. 7, 2007.

PCT/US09/42002; Filed Apr. 28, 2009; International Search Report; Jun. 2009.

PCT/US09/45911; Filed Jun. 2, 2009; International Search Report dated Jul. 15, 2009.

Industry Standard, The, Help FAQs for Standard Prediction Market, http://www.thestandard.com/help, downloaded Jun. 29, 2009.

PCT/US09/45725; International Search Report dated Jul. 15,2009; Applicant Strands, Inc.

International Search Report PCT/US2009/051233 dated Sep. 4, 2009; Applicant: Strands, Inc.

PCT/US2006/004257 European Search Report dated Oct. 23, 2009.

IEEE, no matched results, Nov. 11, 2009, 1 page.

PCT/US09/68604 International Search Report dated Feb. 17, 2010.

\* cited by examiner

SYSTEMS AND METHODS FOR PROMOTIONAL MEDIA ITEM SELECTION AND PROMOTIONAL PROGRAM UNIT GENERATION

RELATED APPLICATIONS

This application is a divisional of application Ser. No. 11/541,915 filed Oct. 2, 2006, now U.S. Pat. No. 7,877,387 titled "SYSTEMS AND METHODS FOR PROMOTIONAL MEDIA ITEM SELECTION AND PROMOTIONAL MEDIA ITEM SELECTION AND PROMOTIONAL PROGRAM UNIT GENERATION" which claims the benefit under 35 U.S.C. §119(e) of U.S. Provisional Patent Application No. 60/722,750 filed Sep. 30, 2005, and titled "SYSTEM AND METHOD FOR DYNAMICALLY IDENTIFYING A SET OF MEDIA ITEMS RESPONSIVE TO AN INPUT SET OF MEDIA ITEMS BY USING METRICS AMONG MEDIA ITEMS." This application also claims the benefit under 35 U.S.C. §119(e) of U.S. Provisional Patent Application No. 60/730,599 filed Oct. 26, 2005, and titled "SYSTEM AND METHOD FOR PROVIDING INDIVIDUALLY CUSTOMIZED MEDIASET INCORPORATING INDIVIDUALLY CUSTOMIZED PROMOTIONAL MEDIASET." The three foregoing applications are incorporated herein by specific reference.

BRIEF DESCRIPTION OF THE DRAWINGS

Understanding that drawings depict only certain preferred embodiments of the invention and are therefore not to be considered limiting of its scope, the preferred embodiments will be described and explained with additional specificity and detail through the use of the accompanying drawings in which.

DETAILED DESCRIPTION OF PREFERRED EMBODIMENTS

Figure 1:
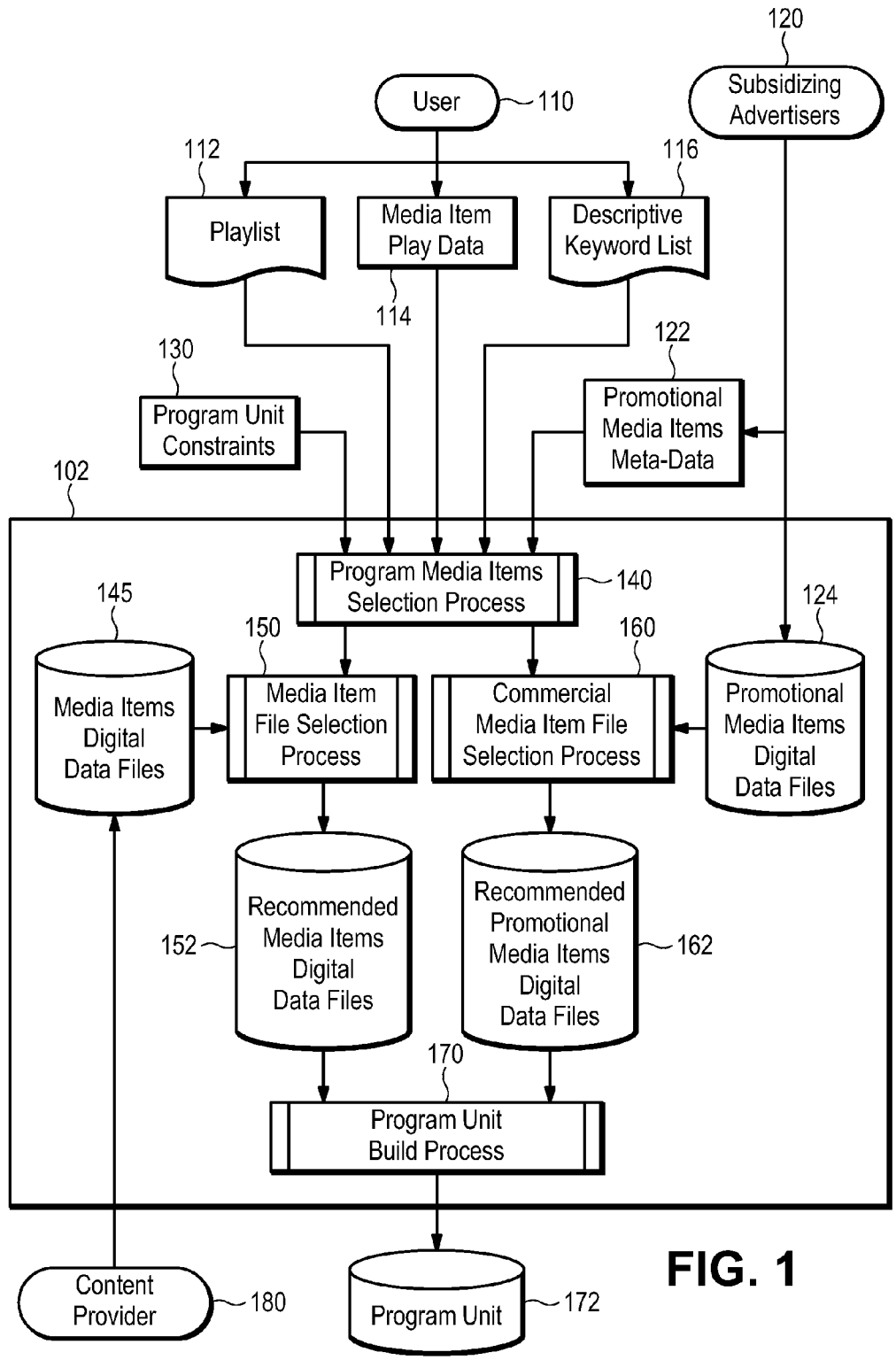
FIG. 1 is a block diagram of an illustrative process for building a program unit responsive to user taste data.

In the following description, certain specific details of programming, software modules, user selections, network transactions, database queries, database structures, etc., are provided for a thorough understanding of the specific preferred embodiments of the invention. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in a variety of alternative embodiments. In some embodiments, the methodologies and systems described herein may be carried out using one or more digital processors, such as the types of microprocessors that are commonly found in PC's, laptops, PDA's and all manner of other desktop or portable electronic appliances.

Disclosed are embodiments of systems and methods for selection of promotional media items and/or generation of advertising units. In some embodiments, a system for constructing a program unit composed of one or more media items and one or more promotional media items is provided. The media items may be selected to be responsive to a particular user's, or group of users', tastes. The promotional media items may also be selected to be responsive to the media items in the program unit and the user's/users' tastes so that they are of greater interest to the user(s) than a random selection of promotional media items. The media items and promotional media items may also be selected to meet additional constraints, such as the number, licensing costs, and revenue generated by the program unit, as well as other statutory or contractual compositional constraints. Some embodiments may provide for systems and methods for constructing program units which also are responsive to the tastes of a user, some of which can generate advertising revenues which offset the licensing costs of the media items.

In some embodiments, a media recommender subsystem and a promotional media recommender subsystem are provided. The media recommender subsystem may generate media items, and the promotional media recommender subsystem may generate promotional media items, responsive to one or more user taste preferences. A means for using these recommenders to generate a set of media items and set of promotional media items which satisfy certain constraints may also be provided. The selected items may then be combined into a single program unit, such as a promotional program unit.

As used herein, the term "media data item" is intended to encompass any media item or representation of a media item. A "media item" is intended to encompass any type of media file which can be represented in a digital media format, such as a song, movie, picture, e-book, newspaper, segment of a TV/radio program, game, etc. Thus, it is intended that the term "media data item" encompass, for example, playable media item files (e.g., an MP3 file), as well as metadata that identifies a playable media file (e.g., metadata that identifies an MP3 file). It should therefore be apparent that in any embodiment providing a process, step, or system using "media items," that process, step, or system may instead use a representation of a media item (such as metadata), and vice versa.

Likewise, the term "promotional media data item" is intended to encompass any promotional media item or representation of a promotional media item. A promotional media item is a media item which promotes, publicizes, advertises, advances, etc., something other than the promotional media item itself. A promotional media item can be of different types, e.g., a commercial advertisement, public service announcement, editorial, political endorsement, etc. Again, in any embodiment providing a process, step, or system using "promotional media items," that process, step, or system may instead use a representation of a promotional media item (such as metadata), and vice versa.

A "play" of a media item is a presentation of the digital data for the media item to the user in a form such that the user can perceive the expressive content of the media item. A "playlist" is a list of media items grouped by the user as a composition. A media item recommender is a system or method for generating a list of media items which are responsive to another input list of media items. A promotional media item recommender is a system or method for generating a list of promotional media items which are responsive to another input list of media items. Examples of recommender systems that may be used in connection with the embodiments set forth herein are described in U.S. patent application Ser. No. 11/346,818 titled "Recommender System for Identifying a New Set of Media Items Responsive to an Input Set of Media Items and Knowledge Base Metrics," now U.S. Pat. No. 7,734,569, which is incorporated herein by reference in its entirety.

As used herein, a "program unit" is an integral item comprised of one or more media items and one or more promotional media items. A webcast is the transmission of digital media items from a computer server system over the Internet to a plurality of user computers incorporating digital media players that make the expressive content of the media items perceptible to the user. A podcast is the transmission of digital media items from a computer server system over the Internet to a plurality of user computers incorporating means for conveying the digital media items to a portable digital media player that makes the expressive content perceptible to the user.

A program unit may be a composition that, for certain types of media items (e.g., sound recordings) integrated therein, is protected under copyright laws from being decomposed into individual component media items that could be conveyed to others. In addition, for many types of media items and digital encoding formats, once the media items and promotional media items have been encoded into a single file of digital data, an encoding format may be used that makes it technically infeasible for a user lacking expert technical skills to decompose the integral program unit back into component items. Therefore, the license holders for the media items may be protected from lost royalties due to illegal conveyance of individual media items.

As used herein, a "mediaset" is a list of media items that, for example, an advertiser has grouped together. A promotional mediaset is therefore a list of promotional media items that have been grouped together.

As used herein, a "metric" M between a media item i and a promotional media item j, or between a media item i and a media item j, for a given knowledge base K, expresses the strength of association between i and j with respect to K. A metric may be expressed as a distance, where smaller distance values represent stronger association values, or, alternatively, as a similarity, where larger similarity values represent stronger association values.

A matrix representation for metric M for a given knowledge base K can be defined as a two-dimensional matrix where the element $M(i,j)$ is the value of the metric between the media item i and a promotional item j, or between a media item i and a media item j.

A graph representation for a given knowledge base K, is a graph where nodes represent media items and/or promotional media items, and edges are between pairs of media items or between media items and promotional media items. Pairs of media items i, j may be linked by labeled directed edges, where the label indicates the value of the similarity or distance metric $M(i,j)$ for the edge with head media item i and tail media item j. Media items and promotional media items may alternatively be linked by labeled undirected edges, where the label indicates the value of the similarity or distance metric $M(i,j)$ for the edge with head media item i and tail promotional media item j.

One specific embodiment is shown in and described with reference to FIG. 1. A user 110 provides information about his or her personal tastes in media items to the system 102. These tastes may be provided, for example, in the form of one or more media item playlists 112 via a computer and software program, a portable digital media player that is a standalone device, or a communications device, such as a telephone, with embedded digital media player technology. User taste data may also be provided as a list of media items 114 recently played by the user on a digital media player of any type. User taste data may also be provided as a list of descriptive keywords 116 that specify the type and/or characteristics of media items of interest to the user.

Advertisers 120 may provide promotional media items to the system 102 in the form of, for example, digital data files 124. Advertisers may also supply metadata 122 with the promotional media items 124 to the program media items selection process 140 to associate individual promotional media items with media items. Examples of metadata 122 include descriptive keywords about a promotional media item, specific target demographics for a promotional media item, identifiers for media items embedded in the promotional media item, and/or an explicit list of media items with which the advertiser wishes to associate a promotional media item, one or more of which may be used by a promotional media item recommender to provide promotional media items responsive to the media items supplied to it.

One or more program unit constraints 130 may also be used to narrow the pool of media data items and/or promotional media data items from which items are selected for the program unit. One such constraint may limit the number of media data items associated with a particular artist. Other constraints may limit the licensing costs associated with the media data items. Still other constraints may be configured to ensure that the media data items and the promotional media data items selected for a promotional program unit are selected such that advertising revenues associated with the promotional media data items are at least equal to licensing costs associated with the media data items.

Figure 2:
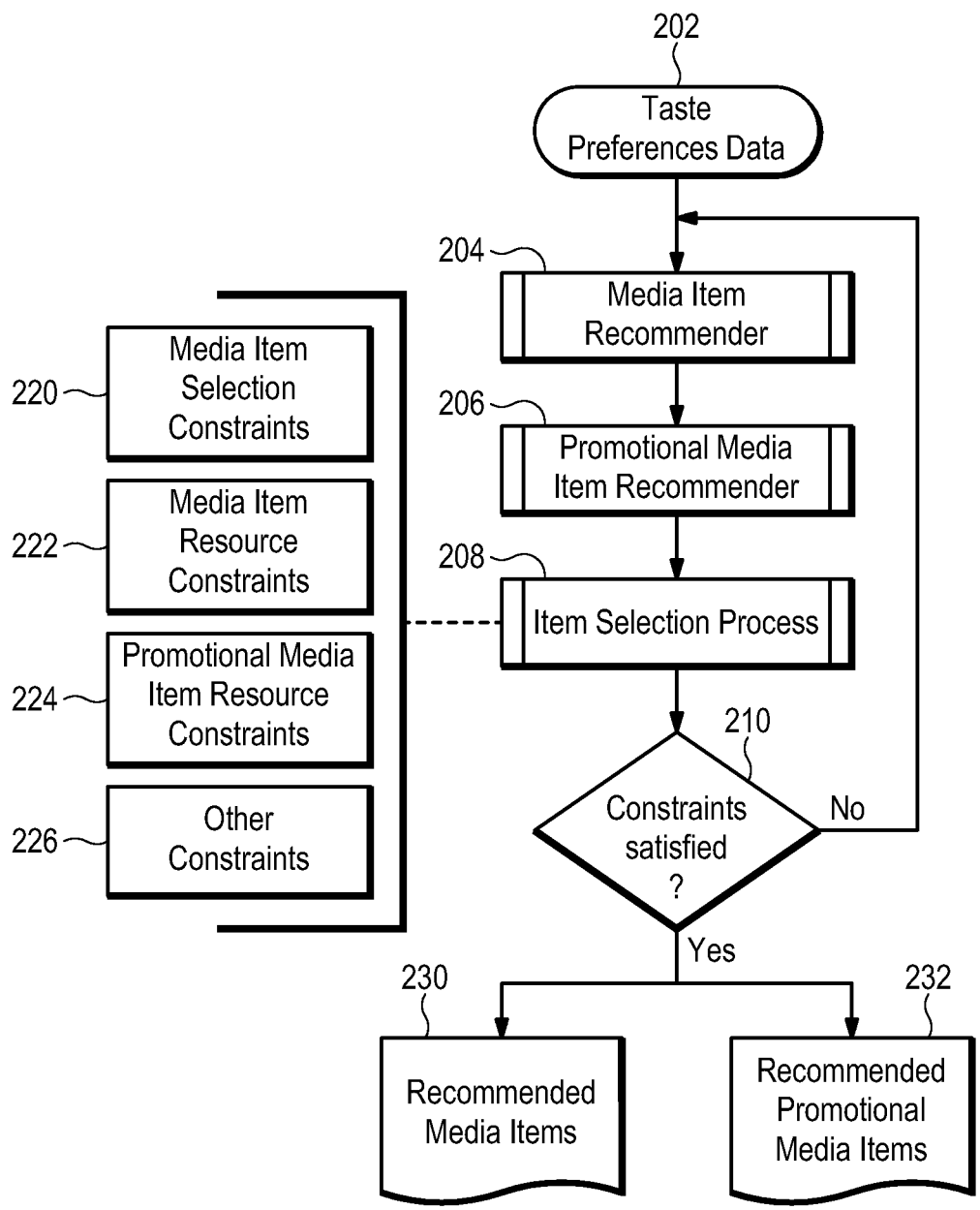
FIG. 2 is a flowchart of an illustrative process for selecting media items and promotional media items for a program unit.

The program media selection process 140, described further below, may ultimately produce a list of recommended media items 230 and a list of recommended promotional media items 232, as shown in FIG. 2. The recommended media items 230 and recommended promotional media items 232 may be selected to satisfy the program unit constraints 130, and may also be responsive to the user-supplied taste data 112, 114, and/or 116.

The media item file selection process 150 may use the list of recommended media items 230 to select digital data files 152 for the recommended media items from the collection of media item digital data files 145. Digital data file collection 145 may be provided by a content provider 180. Similarly, the promotional media item selection process 160 may use the list of recommended media items 232 to select digital data files 162 for the recommended promotional media items from the collection of promotional media item digital data files 124.

The digital data files 152 for the recommended media items 230 and digital data files 162 for the recommended promotional media items 232 may then be combined by the program build process 170 into a single digital data file representing the program unit 172. The media items 230 and promotional media items 232 may be a mix of different media types with different media encoding formats (e.g., MP3, AAC, Vorbis, RealAudio, WMA, Theora, RealVideo, WMV, MPEG) and multimedia container file formats (e.g., AVI, QuickTime, Ogg, RealMedia, ASF). In one embodiment that relates to a mix of media items 230 and promotional media items 232 which can be packaged in a single multimedia container file format, the program build process 170 packs the mix of media and promotional media items into a program unit file 172 with that multimedia container file format.

In another embodiment that relates to a mix of media items 230 and promotional media items 232 which can be encoded into a single media encoding format, the build process 170 first decodes each of the media items and promotional media items with an appropriate decoder, concatenates the now unencoded items into a single file, and inserts any desired filler media items between them. The resulting items may then be encoded into a program unit file 172 with the appropriate single media encoding format.

Another aspect of the program unit build process 170 is the manner in which promotional media items are sequenced with the media items in the program unit 172. In one embodiment, the promotional media items are interleaved between groups of media items. The size of the groups may be specified by the program operator. In another embodiment, the promotional media items are inserted in the sequence of media at appropriate points defined by an "auto-DJ" program that achieves some overall compositional objective. In yet another embodiment, the promotional media items may be grouped before, after, or both before and after, the entire set of media items.

One illustrative implementation of the program media selection process 140 is shown in the flowchart of FIG. 2. The depicted selection process utilizes a media item recommender 204 and a promotional media item recommender 206. The media recommender system 204 produces a set of recommended media items 230 responsive to the user taste data 202 (112, 114, and/or 116 in FIG. 1) from the collection of media item digital data files 145 from content providers 180. Some embodiments can incorporate a media item recommender which accepts one or more of the constraints 220, 222, 224, and 226 provided to the selection process 208 to further constrain the set of recommended media items to those that are of most utility in the rest of the selection process. Other embodiments can incorporate a media item recommender which, to the extent possible, supplies a requested number of media items estimated from constraints 220, 222, 224, and 226.

The promotional media item recommender system 206 likewise produces a set of recommended promotional media items 232 responsive to the user taste data 202 and/or the list of media items produced by the media item recommender 204.

Various embodiments can incorporate different methods for generating sets of recommended media items 230 and recommended promotional media items 232 that satisfy one or more constraints, such as constraints 220, 222, 224, and 226. One embodiment implements a simple "greedy" algorithm as follows. The media item recommender 204 is used to generate a preliminary set of media items responsive to the user taste data 202. The promotional media item recommender 206 is then used to generate a preliminary set of promotional media items responsive to the user taste data 202 and the preliminary set of media items. The preliminary set of media items and the preliminary set of promotional media items are supplied to the item selection process 208, along with the item constraints 220, 222, 224, and 226. These constraints may be used to select a final list of media items and promotional media items that satisfy the constraints.

If the constraints are not satisfied, as exemplified by the test 210, the process extends the preliminary set of recommended media items and promotional media items with additional recommendations from the recommenders 204 and 206. This process of extending the list of recommended media items and promotional media items, selecting subsets that satisfy the constraints, and testing if the constraints are satisfied, repeats until a final set of recommended media items 230 and a final set of recommended promotional media items 232 are generated. Alternatively, these steps may be repeated until an arbitrary termination criteria, such as reaching a predetermined maximum number of attempts, is met to avoid infinite repetition of the process.

The item selection process 208 is understood to embody any process for selecting an optimal subset of items from an input set of items, subject to a set of constraints on the properties of the items. One such class of constraints that may be imposed on the items in the final program unit is made up of resource constraints 222 and 224. These constraints can be generally formulated as an integer-programming problem, as follows. Given a set of media items $m1, m2, \ldots, mk$ with play times $t1, t2, \ldots, tk$ that engender licensing costs $c1, c2, \ldots, ck$, and a set of promotional media items $p1, p2, \ldots, pl$ with play times $s1, s2, \ldots, sl$ that generate revenues $r1, r2, \ldots, rl$, select a subset M of media items and a subset P of promotional media items that satisfy the inequalities $$|M| \geq K', \sum_{m_i \in M} t_i \geq T; |P| \leq L', \sum_{p_i \in P} s_i \leq S; \sum_{m_i \in M} c_i - \sum_{p_i \in P} r_i \leq C$$

These inequalities specify that the program unit will include a minimum of K' media items having a minimum total play length of T time units, a maximum of L' promotional media items having a total play length of S time units, and will have a net cost to produce of C. Different embodiments of the invention implementing specific instances of one or more of these general constraints are also contemplated.

For instance, some embodiments may produce program units the licensing costs of which (stemming from use of the incorporated media items) are completely subsidized by advertising revenues (stemming from use of the incorporated promotional media items). Such embodiments may implement the equivalent of setting C=0. Other embodiments, which may be useful for applications in which users will pay a premium for program units not having promotional media items, may implement the equivalent of setting L'=S=0. Some such embodiments may be implemented so as to have a specified maximum cost. A variant of this, in which cost is not a factor to the user, may implement the equivalent of setting $C=\infty$. Another embodiment that places no limits on the number of promotional media items in the program unit, such that advertising revenues offset the licensing costs of the media items to the maximum extent possible, may implement the equivalent of setting $L'=S=\infty$. Yet another embodiment may be structured with the goal of having the cost of the program unit (from the media items) be completely subsidized by advertising revenues (from the promotional media items). Such an embodiment may implement the equivalent of setting $M'=T=0$ and $C=0$.

Embodiments which implement other constraints in the numbers, play times, licensing costs, and generated revenues of the media items and promotional media items incorporated into the program unit are also contemplated, as would be apparent to one of ordinary skill in the art.

Another class of constraints that may be imposed on the program unit in some embodiments are compositional constraints 226 on the set of media items. As one example, in applications including media items that are sound recordings, these compositional constraints may limit the number of media items by the same author or from the same collection of media items pursuant to the "sound recording content selection" conditions included in the statutory license provisions of 17 U.S.C. §114, also known as the Digital Millennium Copyright Act (DMCA). Under these provisions, during any three-hour time period, a transmission may not include more than:

1) Three sound recordings from a particular album, or two sound recordings from the same album consecutively;

2) Four sound recordings by a particular artist, or from a set or compilation of albums; or 3) Three sound recordings by a particular artist consecutively, or from a set or compilation of albums consecutively.

In one implementation of the program media items selection process 140, constraints, such as a list of artists and/or albums, and/or the allowable number of sound recordings by each artist or from each album in the program unit, may be employed. In such implementations, the selection process 140 may operate so as to ensure that the number of selections by each of the listed artists and albums does not exceed a specified number.

Embodiments which supply a sequence of program units to a customer must only ensure that the sequence of program units does not violate the DMCA content-selection criteria in any three-hour period. Such embodiments may therefore constrain the build process 170 so as not to begin a program unit with a media item that would violate the DMCA restrictions when juxtaposed with the media item that ends the previous program unit. Of course, other constraints on the properties of items for specifying an optimal subset of items from a set are contemplated, many of which would be apparent to those of ordinary skill in the art. For example, "greedy" procedures and other heuristics for selecting an optimal subset of items from an input set of items subject to a set of constraints on the properties of the items are well understood to those of ordinary skill in the art.

One of ordinary skill in the art will also understand that, while the above system and methods are described as embodied in a promotional media recommendation system, the inventive system could be used in any system for recommending items that can be associated with a second type of item in a meaningful way to a user.

Other embodiments disclosed herein relate to systems and methods for recommending items to a user in a personalized manner. Some such embodiments relate to recommender systems containing promotional media items which can be associated with an input set of media items.

For example, in some embodiments, a system for identifying a set of promotional media items in response to an input set of media items is provided. The system may use a knowledge base which can include, for example, a set of promotional media items, a collection of mediasets, and specified associations between promotional media items and mediasets. In such embodiments, each promotional media item in the set may be associated with a mediaset in the collection of mediasets. Other systems may use a knowledge base that includes a set of media items, a collection of promotional mediasets, and specified associations between media items and promotional mediasets. A variety of metrics between media items and promotional media items may be considered by, for example, analyzing how the promotional mediasets are associated with the media items or by analyzing how the mediasets are associated with the media items. Such metrics may be stored in a matrix that allows the system to identify promotional media items that compliment an input set of media items. In some embodiments, the metrics may specify not only whether, but also the degree to which, a promotional media item is associated with a media item. The associations between promotional media items and mediasets, or media items and promotional mediasets, may be either explicitly or implicitly specified.

Metrics of the knowledge base of the system may be used to correlate an input set of media items with a preferred set of promotional media items. In some embodiments, different metrics between media items and promotional media items can be built from advertiser-supplied preferences for associating promotional media items and media items, including, but not limited to, metrics which associate:

1) a promotional media item with media items that are embedded in the promotional media item and with other media items that share a characteristic of the embedded media item, such artist, actor, etc.;

2) a promotional media item with media items that the advertiser explicitly specifies;

3) a promotional media item with media items known to be preferred by a particular audience/user, an audience/user specified by the advertiser, and/or an audience/user with certain characteristics; or 4) a promotional media item identified by specific keywords with media items identified by the same keywords.

Such metrics can be represented in an explicit form that directly associates media items with promotional media items. Alternatively, such metrics can be represented in an implicit form that associates media items with media items such that a promotional media item can be associated with a media item via a sequence of intermediate media items and the value of the metric for the promotional media item and the media item is a defined function of the metric for successive pairs of the intermediate media items.

Figures 3A, 3B:
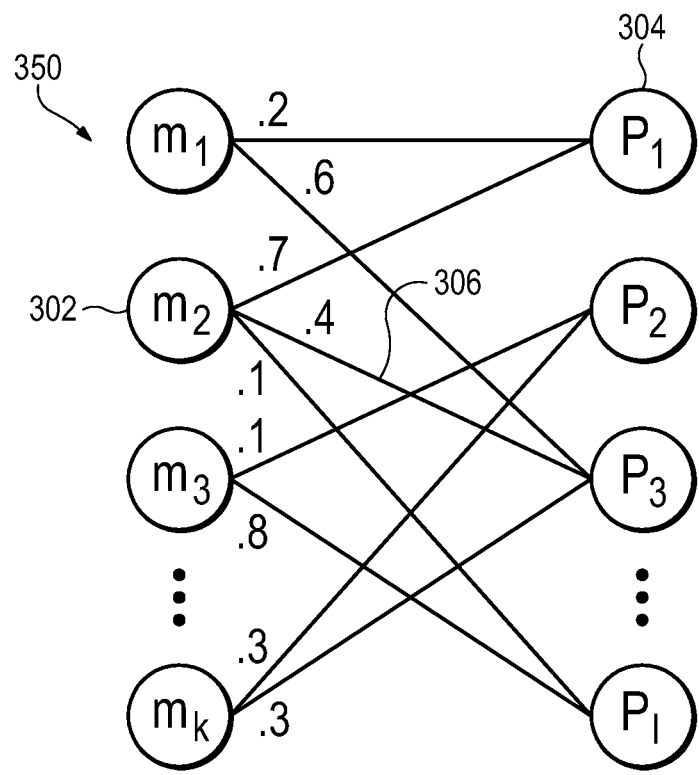
FIG. 3A is a representation in matrix form of a metric describing the similarity values between a collection of media items and a collection of promotional media items.
FIG. 3B provides a weighted, undirected graph representation for the associations between a collection of media items and a collection of promotional media items. Each edge between a media item and a promotional media item is annotated with a weight representing the similarity value between the media item and the promotional media item.
Figure 5:
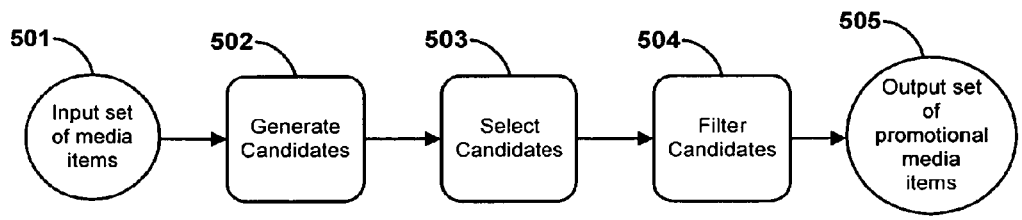
FIG. 5 is a flowchart of an illustrative method for generating an output set of promotional media items from an input set of media items.

One implementation of a method is shown in FIG. 5. The method accepts an input set 501 of media items. A first collection of candidate promotional media items most similar in some respect to the input media items is generated by process 502, based on the metric matrix 300 of FIG. 3A (or the diagram 350 of FIG. 3B). For each media item 302 in the input set 501, process 502 could, for example, add every promotional media item 304 with a non-zero similarity value in the row of metric matrix 300 for the particular media item to the candidate collection of promotional media items. Each promotional media item may then be labeled with its corresponding metric value. To further illustrate, media item m2 is related to promotional media item p3 with similarity value 0.4, as indicated at 306 in FIGS. 3A and 3B.

From this first collection of candidate promotional media items, a second subset of candidate promotional media items is then selected by process 503. As an example, process 503 could order the promotional media items in the first collection in decreasing order according to their respective metric value. The first N unique promotional media items may then be selected as the subset.

Finally, from the subset of promotional media items, a third and final output set 505 of some specified number of promotional media items may be selected. This final output set may be selected so as to satisfy additional desired external constraints by process 504. For instance, in some applications the system may be used to provide promotional media items responsive to input sets of media items where a number of characteristics, such as age, location, etc., are known about the person supplying the input set of media items.

An advertiser that supplied a particular promotional media item may specify that the promotional media item only be provided to persons with certain characteristics, such those of an age within a specified range. If the second collection of promotional media items input to process 504 includes such a promotional media item, process 504 would then add or withhold this promotional media item from the final output set of promotional media items 505, as determined by whether or not the person to whom the promotional media items will be supplied has the characteristic, such as being in the target age group, specified by the advertiser. As another example, process 504 could withhold promotional media items that have been previously supplied to the person associated with the input media set within some designated period of time (or ever) from the output set of promotional media items 505. Any number of other such characteristics for filtering the promotional media items and methods for doing so will be apparent to a person of ordinary skill in the art.

Figures 4A, 4B:
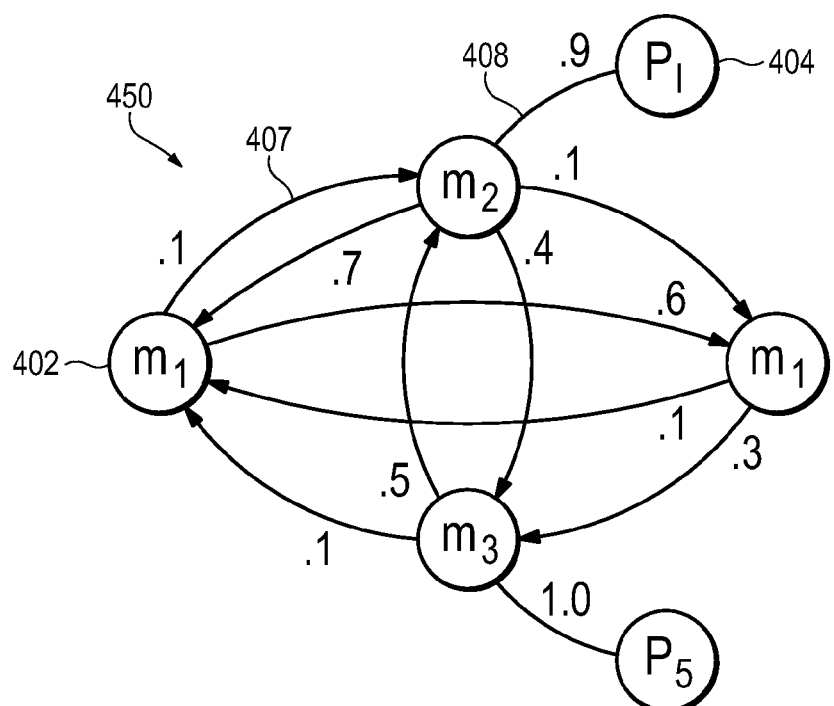
FIG. 4A is a representation in matrix form of a metric describing the similarity values between media items from which a metric relating a collection of media items and a collection of promotional media items may be derived.
FIG. 4B provides a weighted, directed graph representation for the associations between a collection of media items and a collection of promotional media items. Each directed edge between a pair of media items is annotated with a weight representing the similarity value between the media item at the head of the edge and the media item at the tail of the edge. Each undirected edge between a media item and a promotional media item is annotated with a weight representing the similarity value between the media item and the promotional media item.

In other embodiments, explicit associations including similarity values between just a subset of the full set of media items known to the system and the set of promotional media items may be provided, as shown in the graph of FIG. 4B. A set of associations including similarity values between the media items may also provided, either as a matrix 400, as shown in FIG. 4A, or a functionally equivalent form. In the depicted embodiment, if the similarity value between a media item 402, denoted here by the index i, and promotional media item 404, denoted here by the index j, is not explicitly specified, an implicit similarity value may be derived by following a directed path. One example of such a path is represented by edges 407 and 408 from the media path from media item m1 to promotional media item p1 via media item m2. The list M(i, i+1), M(i+1, i+2), ..., M(i+k, j) of similarity values 406 between pairs of media items 402, 404 with the edges on the path labeled may be combined in a manner such that the resulting value satisfies a definition of similarity between media item i and promotional media item j, as appropriate for the application. For example, the similarity M(i,j) might be computed as follows:

$$M(i,j)=\min\{M(i,i+1),M(i,i+2),\ldots,M(i+k,j)\}$$

or $$M(i,j)=M(i,i+1)*M(i,i+2)*\ldots *M(i+k,j)$$

Other methods for computing the similarity value M(i,j) for the path between media item i and promotional media item j, where the edges are labeled with the sequence of similarity values M(i, i+1), M(i+1, i+2), ..., M(i+k, j), will be apparent to a person of ordinary skill in the art.

Figure 6:
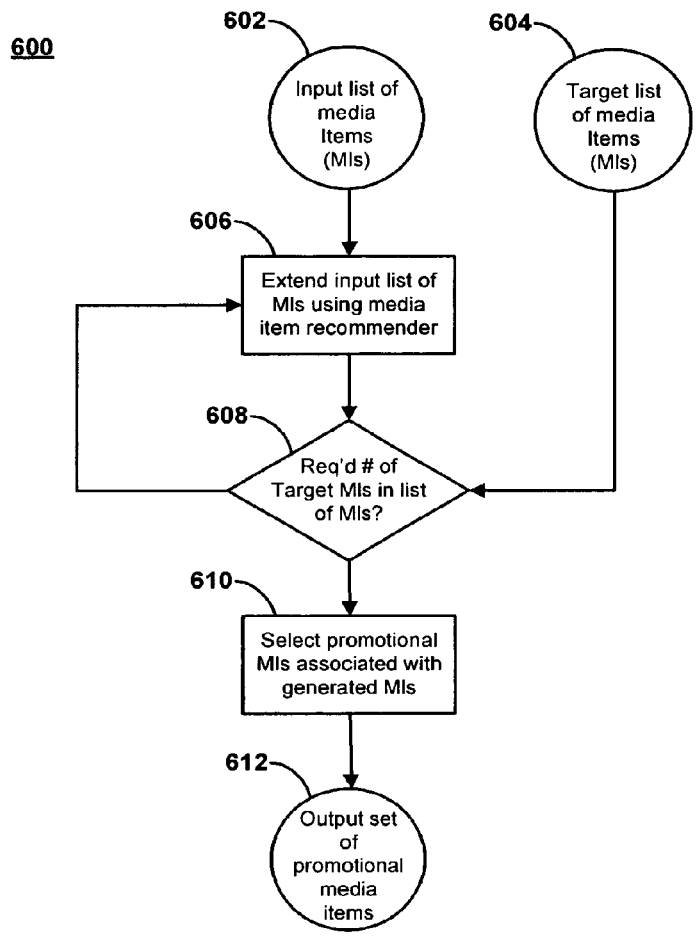
FIG. 6 is a block diagram of an illustrative method for selecting a set of promotional media items corresponding to an input set of media items.

In yet another embodiment corresponding to the graph in FIG. 4B, the similarity metric for pairs of media items represented in FIG. 4A may not be explicitly represented in the form of a matrix but may instead be implicitly embodied by an iterative process, such as process 600 of FIG. 6, that accepts the input set of media items 602 and a second target set 604 of one or more media items explicitly specified to be associated with certain promotional media items. Process 600 may use a media recommender, as indicated at step 606, to iteratively generate a growing list of media items similar to the input media items 602. Exemplary media recommenders that may be used in connection with various embodiments discussed herein are disclosed in U.S. patent application Ser. No. 11/346,818 titled "Recommender System for Identifying a New Set of Media Items Responsive to an Input Set of Media Items and Knowledge Base Metrics," previously incorporated by reference.

The growing list of media items may be compared at step 608 to the target media items 604 and the process of expanding the list may be terminated when it contains the required number of target media items. The promotional media items associated with the target media items in the list of recommended media items may be selected at 610. These promotional media items may then be used as the collection of promotional media items 612 output by process 600 to serve as the first collection of promotional media items used by the process shown in FIG. 5.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. Therefore, it is to be understood that the invention is not to be limited to the specific embodiments disclosed and that modifications and other embodiments are intended to be included within the scope of the appended claims. For example, one of ordinary skill in the art will understand that, while several of the above systems and methods are described as embodied in a promotional media recommendation system, it should be understood that the inventive system could be used in any system for recommending items that can be associated with a second type of item in a meaningful way to a user.

The scope of the present invention should, therefore, be determined only by the following claims.

The invention claimed is:

1. A computer implemented method for generating a promotional program unit, the method comprising:
  receiving user taste data for a user;
  generating a list of promotional media data items responsive to the user taste data;
  generating a list of media data items from a predetermined collection of media item digital data files responsive to the user taste data;
  selecting at least one of the promotional media data items in the list of promotional media data items, wherein the selected promotional media items are associated with an expected advertising revenue;

selecting at least one of the media data items in the list of media data items, wherein the selected media data items include a licensing cost;

combining the at least one selected promotional media data item and the at least one selected media data item into an integrated promotional program unit that is protected from being decomposed into component items, wherein the sum of the expected advertising revenue and the licensing cost of the combined promotional media data items and media data items result in a net cost; and storing the promotional program unit into a memory;

wherein the selecting steps further include the selection of promotional media data items and media data items on the basis of the expected advertising revenue subsidizing the licensing cost to achieve a net cost of as close to zero as possible.

2. The method of claim 1, wherein the user taste data comprises a list of media items selected by the user.

3. The method of claim 1, wherein the user taste data comprises a list of keywords provided by the user.

4. The method of claim 1, wherein the user taste data comprises a playlist that reflects a list of media items grouped together by the user as a composition or a list of media items recently played by the user.

5. The method of claim 1, and further imposing a constraint on properties of the promotional program unit that require it to (a) include at least a selected minimum number of media items, having a selected minimum total play time, and (b) include no more than a selected maximum number of promotional media items, having no more than a selected total play time.

6. The method of claim 1, and further imposing a constraint on properties of the promotional program unit that require it to comply with the compositional constraints for sound recordings, pursuant to the sound recording content selection conditions set by federal copyright statute.

7. The method of claim 1, wherein the media data items comprise playable media files.

8. The method of claim 1, wherein the promotional media data items comprise commercial or eleemosynary advertisements.

9. The method of claim 1, wherein the media data items comprise metadata that identifies or locates a playable media file.

10. The method of claim 1, wherein selecting at least one of the promotional media data items for inclusion in the promotional program unit includes:

receiving an indication of a preferred audience for selected promotional media items, wherein the indication comprises a list of at least one media item selected by the advertiser for association with a corresponding promotional media item; and selecting the corresponding promotional media data item for inclusion in the promotional program unit where the media item associated with the promotional media item matches at least one of the list of media data items listed as responsive to the user taste data.

11. A computer implemented method for generating a promotional program unit, the method comprising:

receiving user taste data for a user;

applying a media item recommender process to the received user playlist to generate a preliminary set of recommended media items responsive to the user playlist;

selecting at least one media data item from the preliminary set of recommended media items responsive to the user taste data;

selecting at least one promotional media data item responsive to the user taste data; and combining the at least one selected promotional media data item and the at least one selected media data item into an integrated promotional program unit that is protected from being decomposed into component items;

wherein the selecting steps further include the selection of promotional media data items and media data items on the basis of the expected advertising revenue subsidize the licensing cost to achieve a net cost of as close to zero as possible.

12. The method of claim 11, and further comprising:

applying a media item recommender process to the received user playlist to generate a preliminary set of recommended media items responsive to the user playlist;

selecting at least one media data item from the preliminary set of recommended media items;

adding the selected at least one media data item from the preliminary set to the promotional program unit;

testing the promotional program unit for compliance with a predetermined overall compositional constraint;

if the promotional program unit does not satisfy the overall constraint, applying the media item recommender process again so as to extend the preliminary set of recommended media items to an expanded set; and then repeating said selecting, adding and testing steps using the expanded set of recommended media items until the promotional program unit does satisfy the overall constraint.

13. The method of claim 12, wherein the overall constraint for testing the promotional program unit requires a selected minimum number of media items, having a selected minimum total play time.

14. The method of claim 12, wherein the overall constraint for testing the promotional program unit requires that the promotional unit include no more than a selected maximum number of promotional media items, having no more than a selected total play time.

15. The method of claim 12, wherein the overall constraint for testing the promotional program unit requires that the promotional unit incur a net cost to produce of no more than a selected maximum cost, wherein the cost to produce the promotional program unit is determined as a sum of the licensing costs of the selected media items, reduced by a sum of the expected revenues generated by the selected promotional media items that are combined to form the promotional program unit.

16. The method of claim 12, wherein the overall constraint for testing the promotional program unit requires that it comply with the compositional constraints for sound recordings, pursuant to the sound recording content selection conditions set by federal copyright statute.

17. A computer-readable storage device storing a set of instructions that upon execution in a processor carry out a method of:

receiving user taste data for a user;

applying a media item recommender process to the received user playlist to generate a preliminary set of recommended media items responsive to the user playlist;

selecting at least one media data item from the preliminary set of recommended media items responsive to the user taste data;

selecting at least one promotional media data item responsive to the user taste data; and combining the at least one selected promotional media data item and the at least one selected media data item into an integrated promotional program unit that is protected from being decomposed into component items;

wherein the selecting steps further include the selection of promotional media data items and media data items on the basis of the expected advertising revenue subsidize the licensing cost to achieve a net cost of as close to zero as possible.

18. The method of claim 1, further comprising computing a set of distance metric values based on the list of promotional media data items and the list of media data items, wherein computing a set of distance metric values includes generating a knowledge base graph, the computing comprising:

representing each promotional media data item in the list of promotional media data items and each media data item in the list of media data items as a node to define a set of nodes;

adding edges connecting the node for each media data item in the list of media data items to each other node of the set of nodes to define a set of edges; and assigning a label to each edge in the set of edges to define a set of labels, wherein the label represents a distance metric value computed using a distance metric applied to a first node and a second node connected by the edge.

19. The method of claim 18, wherein constraining the promotional program unit includes:

assigning a cost to a node, wherein the cost of a node associated with a media data item is a licensing cost of the media data item and the cost of a node associated with a promotional media data item is an expected revenue generated by the promotional media data item;

computing a distance metric value as a net cost of the edge comprising a sum of the licensing cost reduced by a sum of the expected revenue; and incurring a total net cost of no more than a selected maximum cost, wherein the total net cost is computed as a sum of the net costs of the selected media items and the selected promotional media items.

20. The method of claim 11, wherein computing the set of distance metric values includes generating the knowledge base graph, the computing comprising:

representing the at least one media data item and the at least one promotional media data item as a node to define the set of nodes;

adding edges connecting the at least one media data item to each other node of the set of nodes to define a set of edges in the knowledge base graph; and assigning a label to each edge in the set of edges to define a set of labels, wherein the label represents a distance metric value computed using a distance metric applied to a first node and a second node connected by the edge.

21. The method of claim 20, wherein constraining the promotional program unit includes:

assigning a cost to a node, wherein the cost of a node associated with a media data item is a licensing cost of the media data item and the cost of a node associated with a promotional media data item is an expected revenue generated by the promotional media data item;

computing a distance metric value as a net cost of the edge comprising a sum of the licensing cost reduced by a sum of the expected revenue; and incurring a total net cost of no more than a selected maximum cost, wherein the total net cost is computed as a sum of the net costs of the selected media items and the selected promotional media items.

* * * * *